US012432290B2

(12) United States Patent
Seo

(10) Patent No.: US 12,432,290 B2
(45) Date of Patent: Sep. 30, 2025

(54) ELECTRONIC DEVICE WITH CAMERA MODULE AND SLIDING ASSEMBLY

(71) Applicant: SAMSUNG ELECTRONICS CO., LTD., Suwon-si (KR)

(72) Inventor: Dongwoo Seo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 561 days.

(21) Appl. No.: 17/955,359

(22) Filed: Sep. 28, 2022

(65) Prior Publication Data

US 2023/0113041 A1 Apr. 13, 2023

Related U.S. Application Data

(63) Continuation of application No. PCT/KR2022/011988, filed on Aug. 11, 2022.

(30) Foreign Application Priority Data

Oct. 7, 2021 (KR) .......................... 10-2021-0133363

(51) Int. Cl.
H04N 23/57 (2023.01)
H04M 1/02 (2006.01)
H04N 23/51 (2023.01)

(52) U.S. Cl.
CPC .......... *H04M 1/0264* (2013.01); *H04N 23/57* (2023.01)

(58) Field of Classification Search
CPC ...... H04M 1/0264; H04N 23/57; H04N 23/51
See application file for complete search history.

(56) References Cited

U.S. PATENT DOCUMENTS

2015/0009400 A1* 1/2015 Shin .................. G03B 5/00 348/373
2016/0065801 A1* 3/2016 Bae .................. H04N 23/57 348/376

(Continued)

FOREIGN PATENT DOCUMENTS

CN 110248080 9/2019
CN 212543864 2/2021

(Continued)

OTHER PUBLICATIONS

PCT International Report dated Nov. 17, 2022 for PCT/KR2022/011988.

*Primary Examiner* — Charles N Appiah
*Assistant Examiner* — Farideh Madani
(74) *Attorney, Agent, or Firm* — Nixon & Vanderhye P.C.

(57) ABSTRACT

An electronic device may include a housing; a support member disposed inside the housing and including a first hole and a second hole in which a rail is formed in a longitudinal direction toward the first hole; a camera module installed in the support member; and a sliding assembly installed in the second hole to be slidable along the rail. The sliding assembly may include a first sliding member installed in the second hole in a first direction on one side of the second hole and including a contact end portion contactable with the camera module; a second sliding member installed in the second hole in a second direction opposite to the first direction on another side of the second hole such that the rail is positioned between the first sliding member and the second sliding member.

20 Claims, 23 Drawing Sheets

(56) References Cited

U.S. PATENT DOCUMENTS

2017/0135239 A1* 5/2017 Hyun .................... G06F 1/1656
2019/0166236 A1* 5/2019 Zeng ................... H04M 1/0264

FOREIGN PATENT DOCUMENTS

| EP | 0 3029 914 | 8/2019 |
| JP | 2015-179251 A | 10/2015 |
| JP | 6328799 B2 | 4/2018 |
| KR | 10-2009-0047307 A | 5/2009 |
| KR | 10-2009-0109050 | 10/2009 |
| KR | 10-2014-0014787 | 2/2014 |
| KR | 10-2015-0005101 A | 1/2015 |
| KR | 10-2016-0026327 A | 3/2016 |
| KR | 10-2178284 | 11/2020 |

* cited by examiner

ELECTRONIC DEVICE WITH CAMERA MODULE AND SLIDING ASSEMBLY

CROSS-REFERENCE TO RELATED APPLICATIONS

This application is a continuation of International Application No. PCT/KR2022/011988 designating the United States, filed on Aug. 11, 2022, in the Korean Intellectual Property Receiving Office and claiming priority to Korean Patent Application No. 10-2021-0133363, filed on Oct. 7, 2021, in the Korean Intellectual Property Office, the disclosures of which are incorporated by reference herein in their entireties.

BACKGROUND

1. Field

The disclosure relates to an electronic device including a camera module and a sliding assembly.

2. Description of Related Art

An electronic device including a camera may provide a photographing function. For example, the electronic device may output an image acquired from the camera to a display and may acquire a captured image from the camera while a shutter is operating.

SUMMARY

In general, a camera module is connected to a flexible printed circuit board (FPCB) to receive an electrical signal. In a process of installing the camera module in a support structure, the camera module may be tilted at a predetermined angle by the tension of the FPCB. If the camera module is installed in a state of being tilted, the camera module may be decentered with respect to a camera hole. In a related art, to solve such decentering, a structure for supporting the camera module without a gap in a thickness direction is applied. However, in such a structure, as stress is applied to the camera module, the resolving power may be affected, and there is a limitation in improving the decentering due to an error caused by dimensional deviation or flatness.

Certain example embodiments may provide an electronic device that may detect tilting and/or decentering of a camera module and that may adjust an installation state of the camera module.

Example embodiments may provide an electronic device that may correct tilting and/or decentering of a camera module through a movement of a sliding assembly even after the camera module is installed. In an example embodiment, an electronic device may comprise a housing configured to form at least part of an exterior of the electronic device; a support member disposed inside the housing, the support member comprising a first hole, and a second hole in which a rail is formed in a longitudinal direction toward the first hole; a camera module, comprising a camera, installed at least partially in the support member so that the camera is exposed through the first hole; and a sliding assembly installed at least partially in the second hole and configured to be slidable along the rail, wherein the sliding assembly may comprise: a first sliding member installed at least partially in the second hole in a first direction on a side of the second hole, the first sliding member comprising a contact end portion contactable with the camera module; a second sliding member installed at least partially in the second hole in a second direction opposite to the first direction on another side of the second hole such that the rail is positioned between at least the first sliding member and the second sliding member; and a fastener configured to fix relative positions of the first sliding member and the second sliding member with respect to the second hole.

In an example embodiment, an electronic device may comprise a housing configured to form at least part of an exterior of the electronic device; a support member disposed inside the housing, the support member comprising a first hole, and a second hole in which a rail is formed in a longitudinal direction toward the first hole; a camera module, comprising a camera, installed at least partially in the support member so that the camera is exposed through the first hole; and a sliding assembly installed at least partially in the second hole and configured to be slidable along the rail, wherein the sliding assembly comprises: a first sliding member installed at least partially in the second hole in a first direction on a side of the second hole, the first sliding member being contactable with the camera module; a second sliding member installed at least partially in the second hole in a second direction opposite to the first direction on another side of the second hole such that the rail is positioned between at least the first sliding member and the second sliding member; and a fastener configured to fix relative positions of the first sliding member and the second sliding member with respect to the second hole, wherein the first sliding member comprises: a first main body; a first extension body extending from the first main body toward the first hole; and an insertion body extending from the first extension body, and wherein the camera module comprises: a barrel in which the camera is disposed; and an insertion groove formed in the barrel in a shape corresponding to a shape of at least a portion of the insertion body such that at least a portion of the insertion body is inserted.

In an example embodiment, an electronic device may comprise a housing configured to form at least part of an exterior of the electronic device; a support member disposed inside the housing, the support member comprising a first hole, and a second hole in which a rail is formed in a longitudinal direction toward the first hole; a camera module, comprising a camera, installed at least partially in the support member so that the camera is exposed through the first hole; and a sliding assembly installed at least partially in the second hole and configured to be slidable along the rail, wherein the sliding assembly comprises: a first sliding member installed at least partially in the second hole in a first direction on a side of the second hole, the first sliding member comprising a contact end portion contactable with the camera module; a second sliding member installed at least partially in the second hole in a second direction opposite to the first direction on another side of the second hole such that the rail is positioned between at least the first sliding member and the second sliding member; and a fastener configured to fix relative positions of the first sliding member and the second sliding member with respect to the second hole, wherein the first sliding member comprises: a first main body in which a first through-hole is formed; a first extension body extending from the first main body toward the first hole; a pair of first hook portions formed to protrude from a surface of the first main body facing the first direction such that hook heads of the first hook portions face directions opposite to each other; and a second hook portion formed to protrude from a surface of the first main body facing the first direction, wherein the second sliding member comprises: a second main body in which a second through-hole is formed; at least a pair of second extension bodies formed to extend from both sides of the second main body; and a hook insertion hole formed in a corresponding position of the second main body such that the second hook portion is inserted to couple the first sliding member and the second sliding member to each other, wherein the sliding assembly is disposed such that the contact end portion is spaced apart from the camera module in an initial state, and wherein when the camera module is installed to be tilted or decentered, the sliding assembly is moved along the rail in a direction toward the first hole such that the contact end portion is in contact with the camera module.

According to example embodiments, tilting and/or decentering of a camera module may be detected, and an installation state of the camera module may be adjusted.

According to example embodiments, tilting and/or decentering of a camera module may be corrected through a movement of a sliding assembly even after the camera module is installed.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
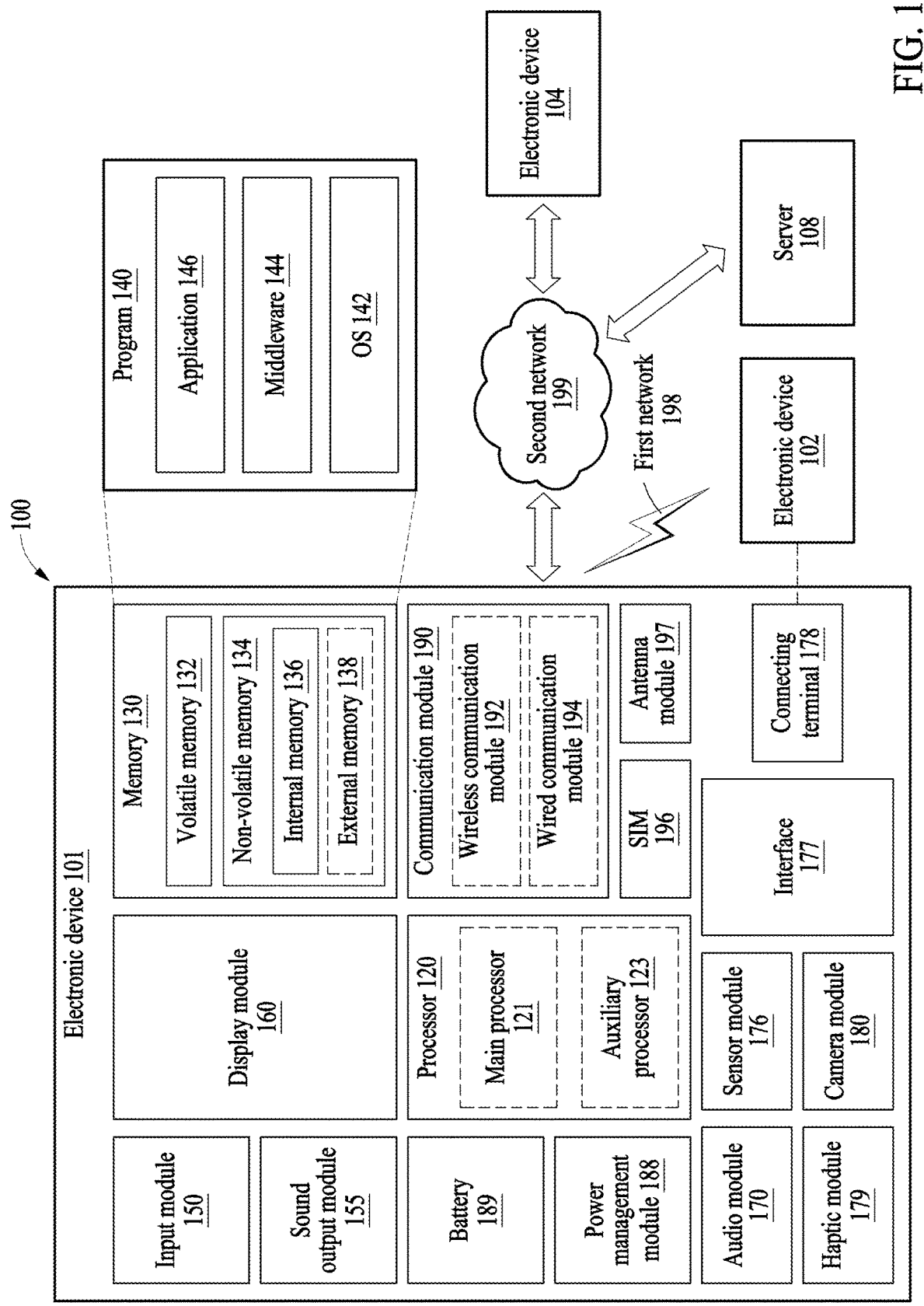
FIG. 1 is a block diagram illustrating an electronic device 101 in a network environment 100 according to example embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120 (including processing circuitry), a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160). Each "module" herein may include circuitry.

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Each processor herein may include processing circuitry.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display device 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, and/or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to various embodiments, the antenna module 197 may form a mmWave antenna module. According to one embodiment, the mmWave antenna module may include a PCB, an RFIC disposed on a first surface (e.g., a bottom surface) of the PCB or adjacent or proximate to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a complier or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Each embodiment herein may be used in combination with any other embodiment described herein.

Figure 2A:
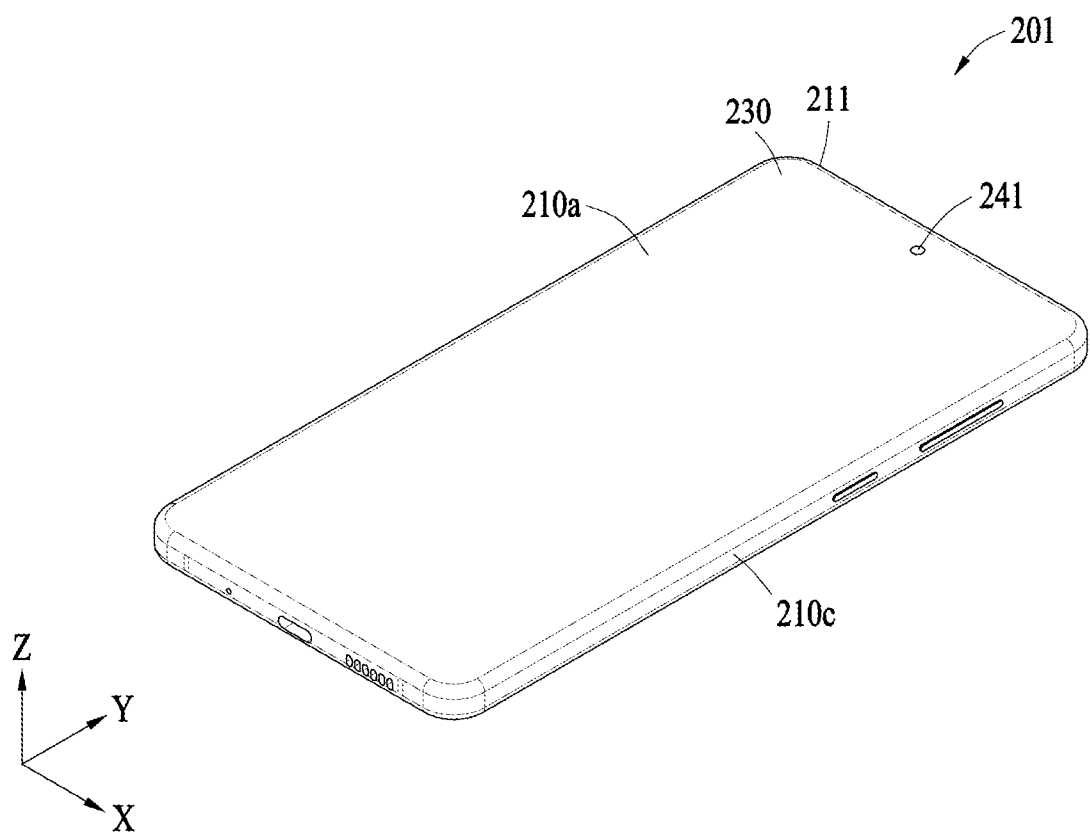
FIG. 2A is a front perspective view of an electronic device according to example embodiments.
Figure 2B:
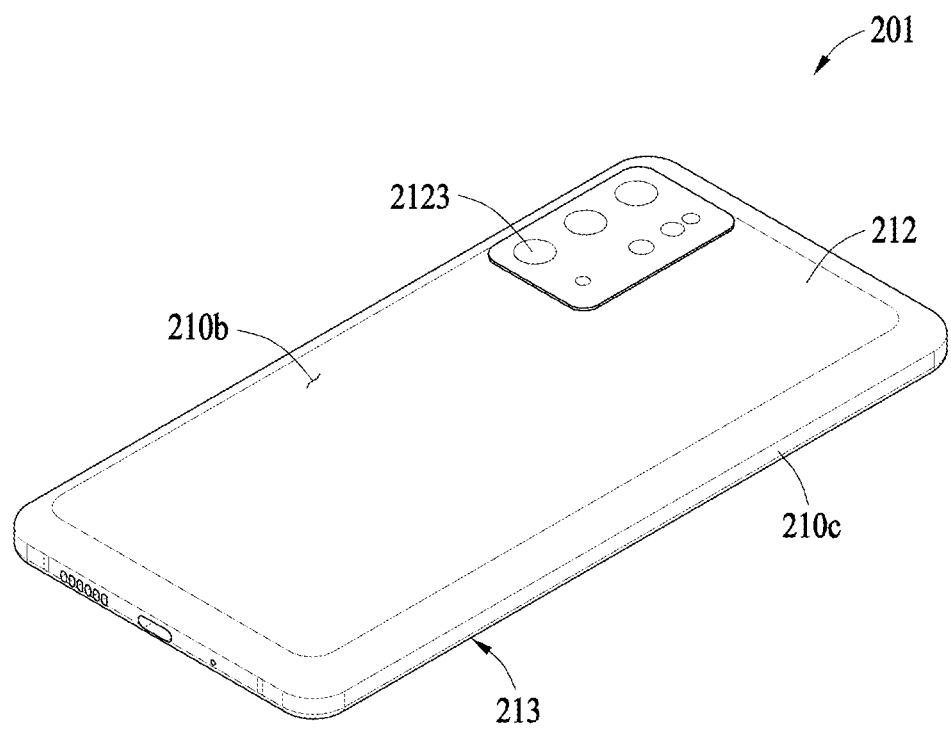
FIG. 2B is a rear perspective view of an electronic device according to example embodiments.
Figure 2B:
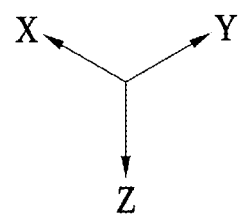
Figure 2C:
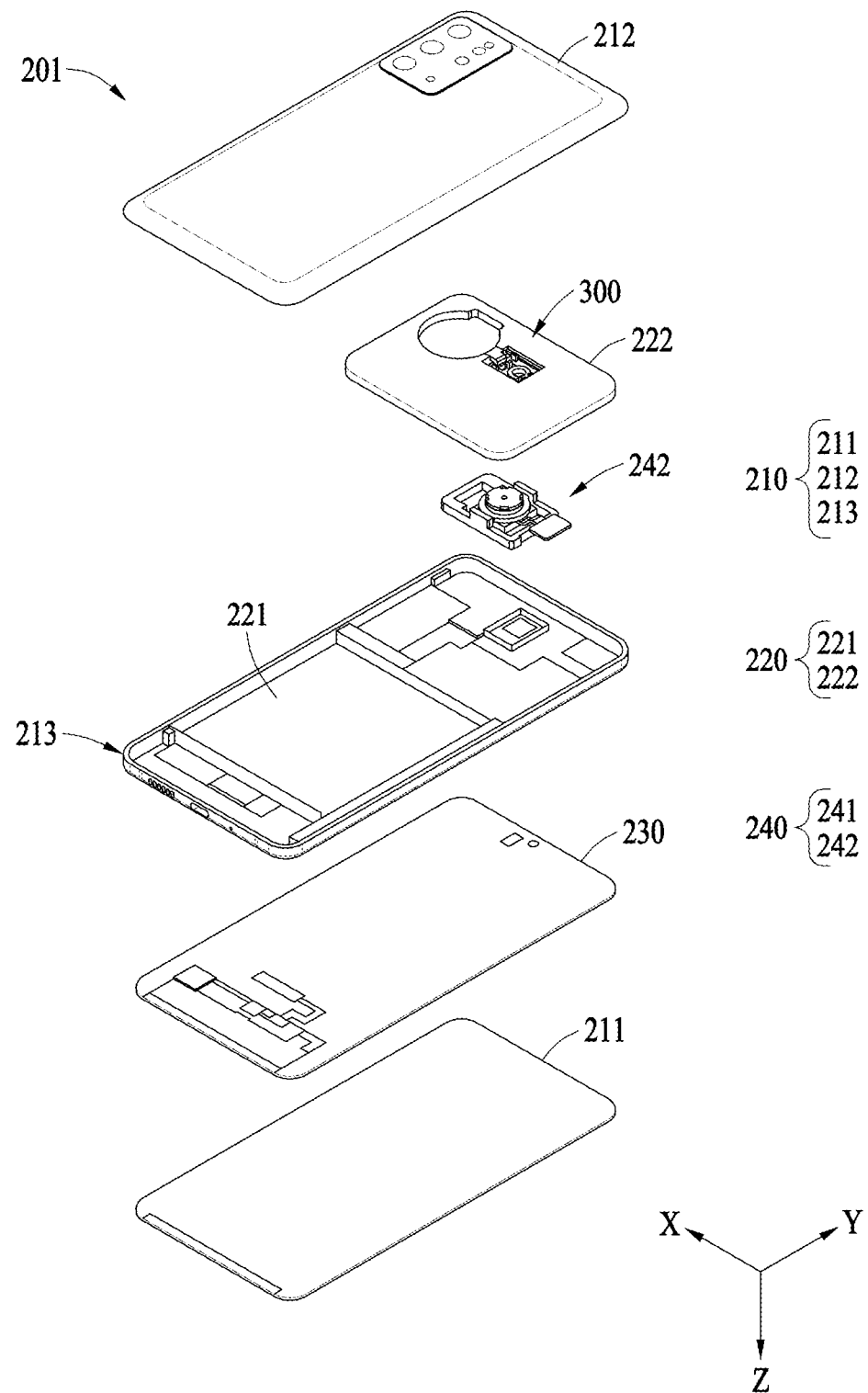
FIG. 2C is an exploded perspective view of an electronic device according to embodiments.

FIG. 2A is a front perspective view of an electronic device according to embodiments, FIG. 2B is a rear perspective view of the electronic device according to embodiments, and FIG. 2C is an exploded perspective view of the electronic device according to embodiments.

Referring to FIGS. 2A, 2B, and 2C, an electronic device 201 (e.g., the electronic device 101 of FIG. 1) according to one embodiment may include a housing 210, a support member 220, a display 230, a camera module 240, and a sliding assembly 300.

In one embodiment, the housing 210 may form an exterior of the electronic device 201. The housing 210 may form a front surface 210*a* (e.g., a first surface), a rear surface 210*b* (e.g., a second surface), and a side surface 210*c* (e.g., a third surface) surrounding an inner space between the front surface 210*a* and the rear surface 210*b*. For example, the housing 210 may include a first plate 211 (e.g., a front plate), a second plate 212 (e.g., a rear plate), and a side member 213 (e.g., a side bezel structure).

In one embodiment, the front surface 210a may be formed by the first plate 211 of which at least a portion is substantially transparent. For example, the first plate 211 may include a polymer plate or a glass plate including at least one coating layer. In one embodiment, the rear surface 210b may be formed of the second plate 212 that is substantially opaque. For example, the second plate 212 may be formed of coated or tinted glass, ceramic, polymer, metal (e.g., aluminum, stainless steel, or magnesium), or a combination thereof. The side surface 210c may be coupled to the first plate 211 and the second plate 212 and may be formed by the side member 213 including metal and/or polymer. In one embodiment, the second plate 212 and the side member 213 may be integrally and seamlessly formed. In one embodiment, the second plate 212 and the side member 213 may be formed of substantially the same material (e.g., aluminum). For example, the second plate 212 may include an individual camera window 2123 for each camera module (e.g., a second camera module 242).

In one embodiment, the side member 213 may surround at least a portion of the inner space between the front surface 210a and the rear surface 210b. The support member 220 may be disposed in the inner space of the housing 210. For example, the support member 220 may be connected (directly or indirectly) to the side member 213 or may be formed integrally with the side member 213. The support member 220 may form an arrangement space of components of the electronic device 201. The support member 220 may include a first support member 221 and a second support member 222. For example, the first support member 221 may connect (directly or indirectly) an edge of the first plate 211 and an edge of the second plate 212 and may surround a space between the first plate 211 and the second plate 212. For example, the display 230 may be coupled to one surface (e.g., a surface in the +z direction) of the first support member 221. The second support member 222 may be disposed on another surface (e.g., a surface in the −z direction) of the first support member 221. However, this is merely an example, and the second support member 222 may also be formed integrally with the first support member 221. The second plate 212 may be disposed on one surface (e.g., a surface in the −z direction) of the second support member 222. In one embodiment, at least a portion of the side member 213 may be formed of a conductive material. For example, the first support member 221 may be formed of a metal and/or a conductive polymer material. In one embodiment, like the first support member 221, the second support member 222 may be formed of a metal and/or a conductive polymer material.

In one embodiment, the electronic device 201 may include a display 230 (e.g., the display module 160 of FIG. 1). In one embodiment, the display 230 may be positioned on the front surface 210a. In one embodiment, the display 230 may be exposed through at least a portion of the front plate (e.g., first plate 211). In one embodiment, the display 230 may have a shape that is substantially the same as a shape of an outer edge of the first plate 211. In some embodiments, a periphery of the display 230 may substantially coincide with the outer edge of the first plate 211. In one embodiment, the display 230 may include a touch sensing circuit, a pressure sensor for sensing an intensity (pressure) of a touch, and/or a digitizer for detecting a magnetic-type stylus pen.

In one embodiment, the electronic device 201 may include the camera module 240 (e.g., the camera module 180 of FIG. 1). In one embodiment, the camera module 240 may include a first camera module 241 and a second camera module 242. In one embodiment, the first camera module 241 may be disposed to be visually exposed through the front surface 210a of the housing 210, and the second camera module 242 may be disposed to be visually exposed through the rear surface 210b of the housing 210. In one embodiment, at least a portion of the first camera module 241 may be disposed in the housing 210 so as to be covered through the display 230. Although one second camera module 242 is illustrated in FIG. 2C, this is an example for convenience of description and illustration, and one or a plurality of second camera modules 242 may be provided.

Figure 3A:
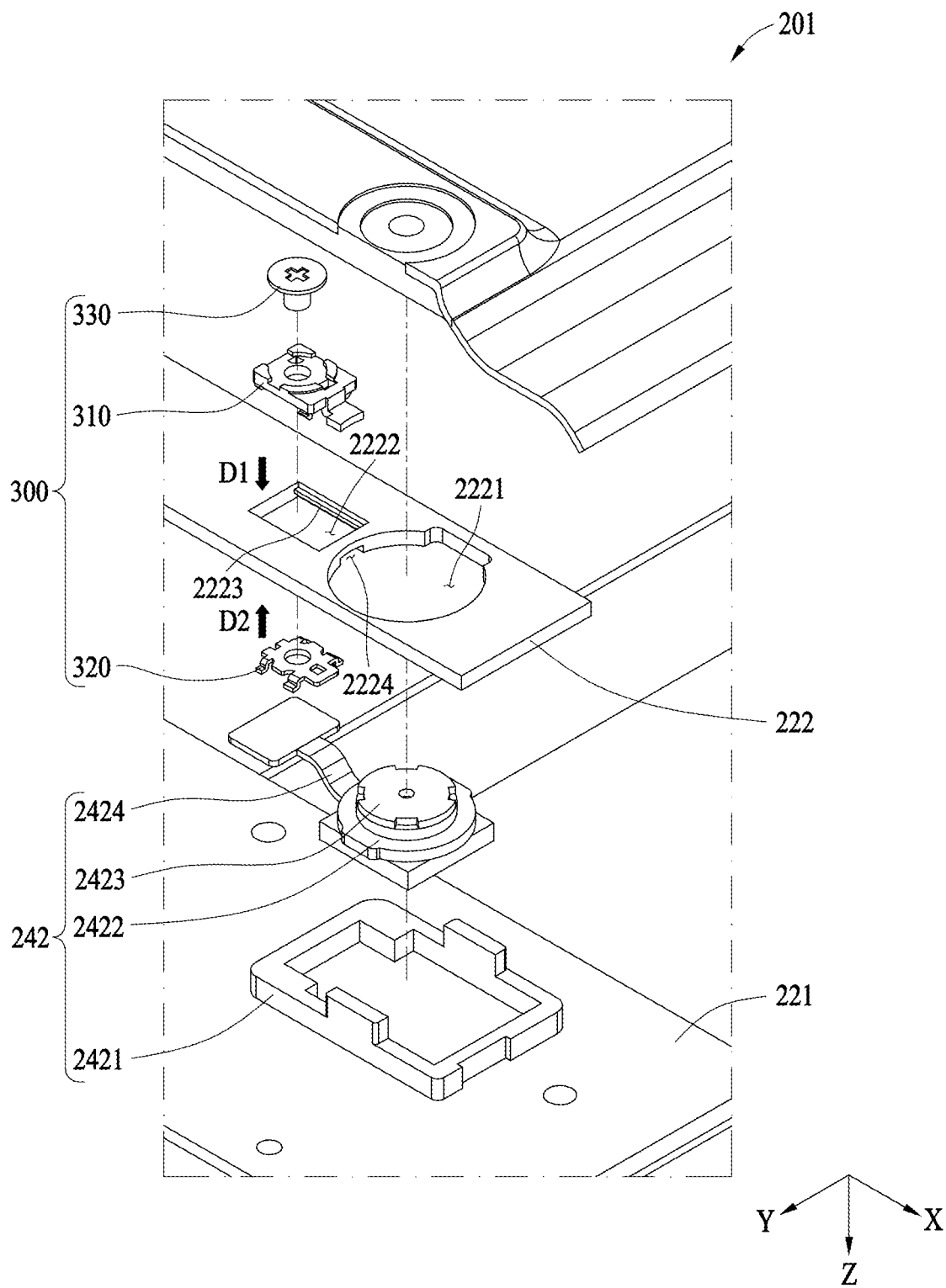
FIG. 3A is an exploded perspective view illustrating a portion of an electronic device according to an example embodiment.

FIG. 3A is an exploded perspective view illustrating a portion of an electronic device according to one embodiment.

Referring to FIG. 3A, in one embodiment, the second camera module 242 may be installed on the support member 220. For example, a lower side (e.g., a +z direction side) of the second camera module 242 may be installed on the first support member 221. At least a portion of the second camera module 242 may be exposed through a first hole 2221 formed in the second support member 222.

In one embodiment, the second camera module 242 may include a bracket 2421, a barrel 2422, a camera 2423, and a flexible printed circuit board (FPCB) 2424.

In one embodiment, the bracket 2421 may provide a space in which the camera 2423 is installed. A lower side (e.g., the +z direction side) of the bracket 2421 may be fixedly connected (directly or indirectly) to the first support member 221. The camera 2423 may be disposed in the barrel 2422. The barrel 2422 may be connected to the bracket 2421. The FPCB 2424 may be electrically connected to the camera 2423 to transmit an electrical signal to the camera 2423. For example, the FPCB 2424 may extend from the camera 2423 in one direction (e.g., a −x direction). However, this is merely an example, and the second camera module 242 may also be installed on the first support member 221 directly without the bracket 2421.

In one embodiment, the first support member 221 and the second support member 222 may form the arrangement space of components of the electronic device 201. For example, the first support member 221 may be a front support member disposed on a front surface (e.g., a surface in the +z direction) of the electronic device 201. For example, the second support member 222 may be a rear support member disposed on a rear surface (e.g., a surface in the −z direction) of the electronic device 201. The second support member 222 may be connected (directly or indirectly) to a rear surface (e.g., a surface in the −z direction) of the first support member 221.

In one embodiment, the second support member 222 may include a first hole 2221, a second hole 2222, a rail 2223, and a communication hole 2224.

In one embodiment, the first hole 2221 may be formed through the second support member 222 in one direction (e.g., the z direction). The first hole 2221 may be formed at a position corresponding to the camera 2423 of the second camera module 242. For example, at least a portion of the second camera module 242 (e.g., the camera 2423) may pass through the first hole 2221 or may be exposed through the first hole 2221. For example, the first hole 2221 may have a circular shape. A diameter of the first hole 2221 may be substantially equal to or greater than a diameter of the barrel 2422 of the second camera module 242. However, this is merely an example, and a position, a shape, and/or a size of the first hole 2221 are not limited thereto.

In one embodiment, the first hole 2221 may be formed through the second support member 222 in one direction (e.g., the z direction). The second hole 2222 may be formed adjacent or proximate to the first hole 2221. For example, the second hole 2222 may be formed in a position that at least partially overlaps the FPCB 2424 of the second camera module 242 when the electronic device 201 is viewed from the front side (e.g., viewed from the surface in the +z direction). The second hole 2222 may be formed in a longitudinal direction toward the first hole 2221. For example, the second hole 2222 may be formed in a rectangular shape having a longitudinal direction in the x direction. However, this is merely an example, and a position, a shape, and/or a size of the second hole 2222 are not limited thereto.

In one embodiment, the rail 2223 may be formed in the second hole 2222 in the longitudinal direction (e.g., the x direction) of the second hole 2222. A pair of rails 2223 may be formed on both facing side surfaces of the second hole 2222 (e.g., surfaces in the +y direction and the −y direction), respectively. For example, the rails 2223 may protrude from both facing side surfaces (e.g., the surfaces in the +y direction and the −y direction) of the second hole 2222 by a designated length in opposite directions (e.g., the −y direction and the +y direction). Similarly to the second hole 2222, the rails 2223 may be formed to have the longitudinal direction toward the first hole 2221. For example, the rails 2223 may be formed in a longitudinal direction in the x direction.

In one embodiment, the communication hole 2224 may allow the first hole 2221 and the second hole 2222 to communicate with each other. For example, the communication hole 2224 may be recessed to a designated depth from one surface (e.g., a surface in the +z direction) of the second support member 222 so that the first hole 2221 and the second hole 2222 may communicate with each other. However, this is merely an example, and the communication hole 2224 may also be formed through the second support member 222 in one direction (e.g., the z direction).

In one embodiment, the sliding assembly 300 may be installed in the second hole 2222 to be slidable along the rail 2223. The sliding assembly 300 may be configured to adjust an installation state of the second camera module 242. For example, the sliding assembly 300 may be configured to improve tilting and/or decentering of the second camera module 242.

In one embodiment, the sliding assembly 300 may include a first sliding member 310, a second sliding member 320, and a fastening member 330.

In one embodiment, the first sliding member 310 and the second sliding member 320 may be installed in the second hole 2222 of the second support member 222. The first sliding member 310 and the second sliding member 320 may be installed in the second hole 2222 in opposite directions such that the rails 2223 may be positioned therebetween. For example, the first sliding member 310 may be installed in the second hole 2222 in a first direction D1 (e.g., the +z direction) from one side (e.g., a −z direction side) of the second hole 2222. For example, the second sliding member 320 may be installed in the second hole 2222 in a second direction D2 (e.g., the −z direction) opposite to the first direction D1 (e.g., the +z direction) from another side (e.g., a +z direction side) of the second hole 2222. However, this is merely an example, and the first sliding member 310 and the second sliding member 320 may also be installed in positions opposite to those shown in FIG. 3A in the second hole 2222. For example, in one embodiment, the second sliding member 320 may be installed in the first direction D1 (e.g., the +z direction) from the one side (e.g., the side in the −z direction) of the second hole 2222 in the second hole 2222, and the first sliding member 310 may be installed in the second direction D2 (e.g., the −z direction) from the other side (e.g., the side in the +z direction side) of the second hole 2222 in the second hole 2222. The first sliding member 310 and the second sliding member 320 may have structures to be coupled to each other.

In one embodiment, the fastening member 330 may fasten the first sliding member 310 and the second sliding member 320 to each other. For example, the fastening member 330 may penetrate the first sliding member 310 and the second sliding member 320 in the first direction D1. The fastening member/fastener 330 may include, for example, a bolt or screw. By adjusting a fastening strength of the fastening member 330, a degree to which the first sliding member 310 and the second sliding member 320 are in close contact with the rail 2223 may be adjusted. For example, by adjusting the fastening strength of the fastening member 330, the sliding assembly 300 may be slidable with respect to the second hole 2222, or a position of the sliding assembly 300 may be fixed to the second hole 2222. For example, the fastening strength may be adjusted by rotating the fastening member 330 (e.g., a bolt or screw).

Figure 3B:
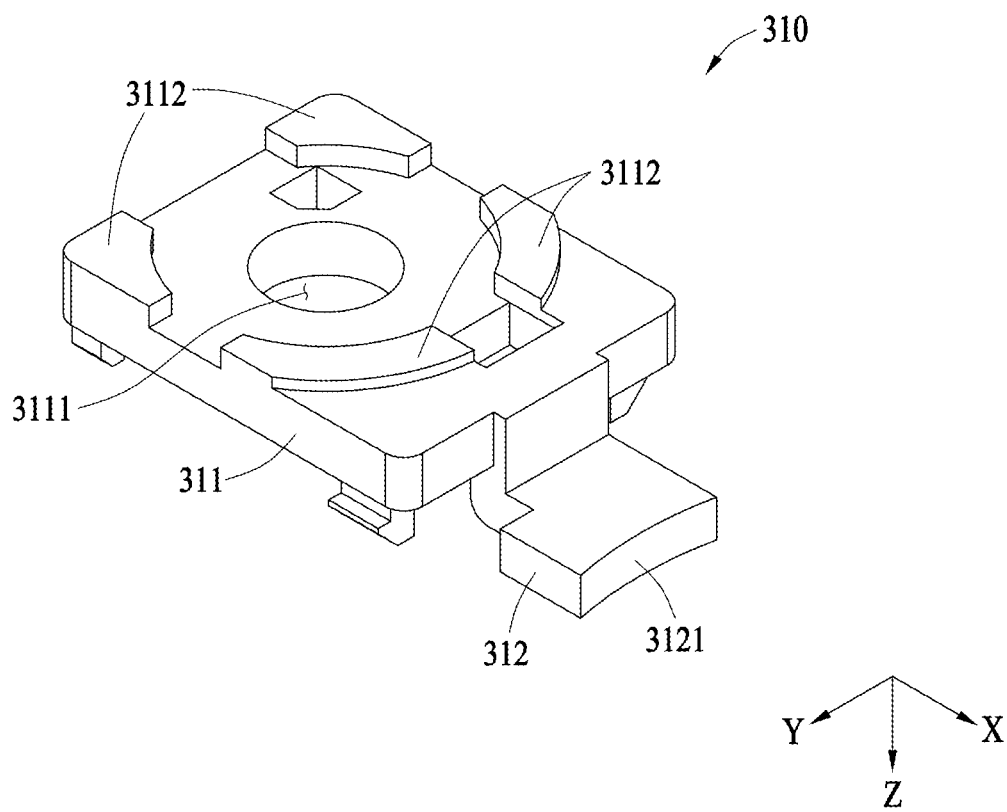
FIG. 3B is a perspective view of a first sliding member according to an example embodiment.
Figure 3C:
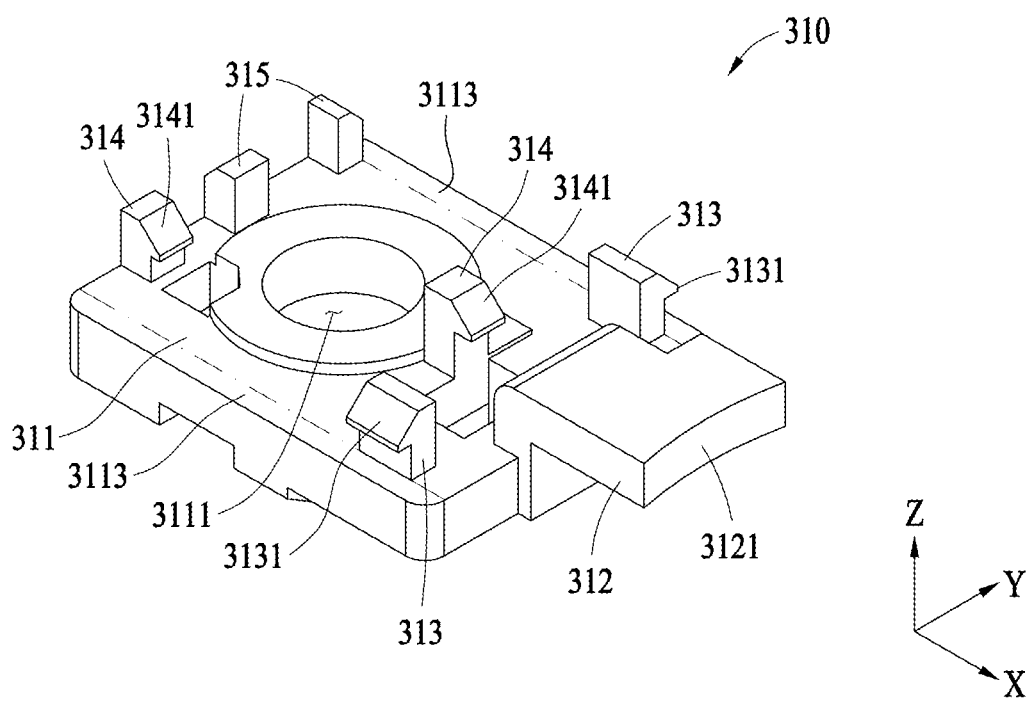
FIG. 3C is a rear perspective view of a first sliding member according to an example embodiment.

FIG. 3B is a perspective view of a first sliding member according to one embodiment. FIG. 3C is a rear perspective view of the first sliding member according to one embodiment.

Referring to FIGS. 3A to 3C, the first sliding member 310 according to one embodiment may include a first main body 311, a first extension body 312, a first hook portion 313, a second hook portion 314, and an aligning protrusion 315.

In one embodiment, the first main body 311 may be provided substantially in a plate shape or a block shape. The first main body 311 may be seated on one side (e.g., a side in the −z direction side) of the second hole 2222. A width (e.g., a y-direction length) of the first main body 311 may substantially correspond to a width (e.g., a y-directional length) of the second hole 2222, or may be less than the width (e.g., the y-directional length) of the second hole 2222 and greater than a gap (e.g., a gap in the y direction) between the rails 2223. A length (e.g., an x-directional length) of the first main body 311 may be less than a length (e.g., an x-directional length) of the second hole 2222 by a designated length.

In one embodiment, a first through-hole 3111 may be formed in the first main body 311. For example, the first through-hole 3111 may be formed through the first main body 311 in one direction (e.g., the z direction). For example, the first through-hole 3111 may be formed in a central portion of the first main body 311. The first through-hole 3111 may be a hole through which the fastening member 330 passes.

In one embodiment, a shoulder 3112 may be formed on a surface (e.g., a surface in the −z-direction) of the first main body 311 facing the second direction D2. For example, the shoulder 3112 may protrude from the surface (e.g., the surface in the −z-direction) of the first main body 311 facing the second direction D2. The shoulder 3112 may be formed along a periphery of a head portion of the fastening member 330 based on a state in which the fastening member 330 is fastened. The shoulder 3112 may form a space for locating the head portion of the fastening member 330 in the state in which the fastening member 330 is fastened. For example, a space formed by shoulders 3112 may be a substantially circular space. However, this is merely an example, and the shoulder 3112 may also be formed if a region corresponding to the head portion of the fastening member 330 is relatively recessed from the surface (e.g., the surface in the −z direction) of the first main body 311 facing the second direction D2.

In one embodiment, a flange 3113 may be formed on a surface (e.g., a surface in the +z direction) of the first main body 311 facing the first direction D1. The flange 3113 may refer to end portions of both sides (e.g., −y and +y direction sides) of the first main body 311. The flange 3113 may be a region in which the first sliding member 310 is in contact with the rail 2223.

In one embodiment, the first extension body 312 may extend from one side (e.g., the +x directional side) of the first main body 311. For example, the first extension body 312 may extend from the first main body 311 toward the first hole 2221. The first extension body 312 may be bent in first direction D1 (e.g., the +z direction) to have a height difference from the first main body 311. For example, the first extension body 312 may extend from one side (e.g., the +x directional side) of the first main body 311 in the first direction D1 (e.g., the +z direction), may be bent and may extend in a direction (e.g., the +x direction) toward the first hole 2221. However, this is merely an example, and a shape of the first extension body 312 is not limited thereto. At least a portion of the first extension body 312 may be positioned in the communication hole 2224. One end portion (e.g., an end portion in the +x direction) of the first extension body 312 may be a contact end portion 3121 that is contactable with the second camera module 242. For example, the contact end portion 3121 may be contactable with the barrel 2422 of the second camera module 242. The contact end portion 3121 may be formed to have a curvature corresponding to an outer circumference of the barrel 2422.

In one embodiment, the first hook portion 313 may protrude from a surface (e.g., a surface in the +z direction) of the first main body 311 facing the first direction D1. At least one pair of first hook portions 313 may be formed. The pair of first hook portions 313 may be formed such that hook heads 3131 of the first hook portions 313 may face directions opposite to each other. For example, in the pair of first hook portions 313, the hook heads 3131 may face a −y direction and a +y direction, respectively. The pair of first hook portions 313 may be formed on both sides (e.g., a −y side and a +y side) of the first main body 311, respectively. The pair of first hook portions 313 may be formed in positions spaced apart inwardly from both end portions (e.g., a −y side end portion and a +y side end portion) of the first main body 311 such that flanges 3113 may be formed on both sides of the first main body 311. For example, a region between the first hook portion 313 and a side end portion (e.g., a −y side end portion or a +y side end portion) of the first main body 311 may be defined as the flange 3113.

In one embodiment, the second hook portion 314 may be formed to protrude from a surface (e.g., a surface in the +z direction) of the first main body 311 facing the first direction D1. One or a plurality of second hook portions 314 may be formed. For example, a pair of second hook portions 314 may be formed. For example, the pair of second hook portions 314 may be spaced apart from each other such that the first through-hole 3111 may be positioned therebetween. For example, one second hook portion 314 may be formed on one side (e.g., a side in the +x direction) of the first main body 311, and the other second hook portion 314 may be formed on another side (e.g., a side in the −x direction) of the first main body 311. For example, hook heads 3141 of the pair of second hook portions 314 may be formed to face the +x direction. However, this is merely an example, and a number of second hook portions 314, a position of the second hook portion 314, and/or a shape of the second hook portion 314 are not limited thereto.

In one embodiment, the aligning protrusion 315 may protrude from a surface (e.g., a surface in the +z direction) of the first main body 311 facing the first direction D1. One or a plurality of aligning protrusions 315 may be formed. For example, two aligning protrusions 315 may be formed. For example, two aligning protrusions 315 may be spaced apart from each other on another end portion (e.g., an end portion in the −x direction) of the first main body 311. However, this is merely an example, and a number of aligning protrusions 315, a position of the aligning protrusion 315, and/or a shape of the aligning protrusion 315 are not limited thereto.

Figure 3D:
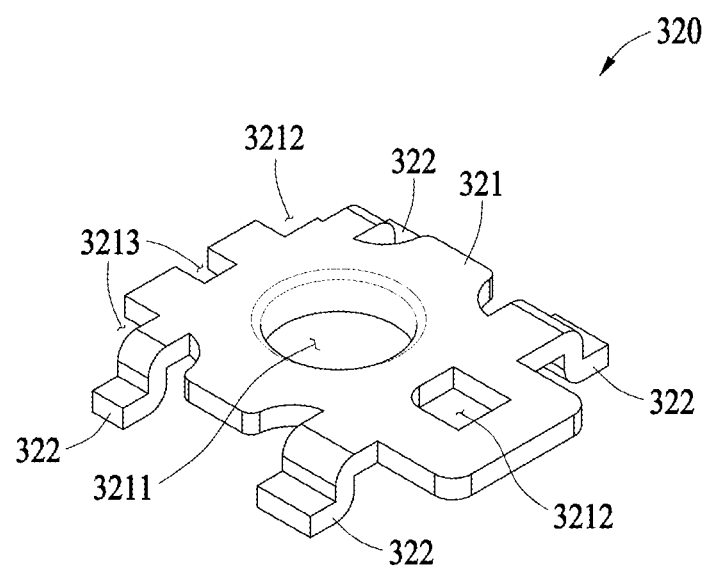
FIG. 3D is a perspective view illustrating a second sliding member according to an example embodiment.
Figure 3E:
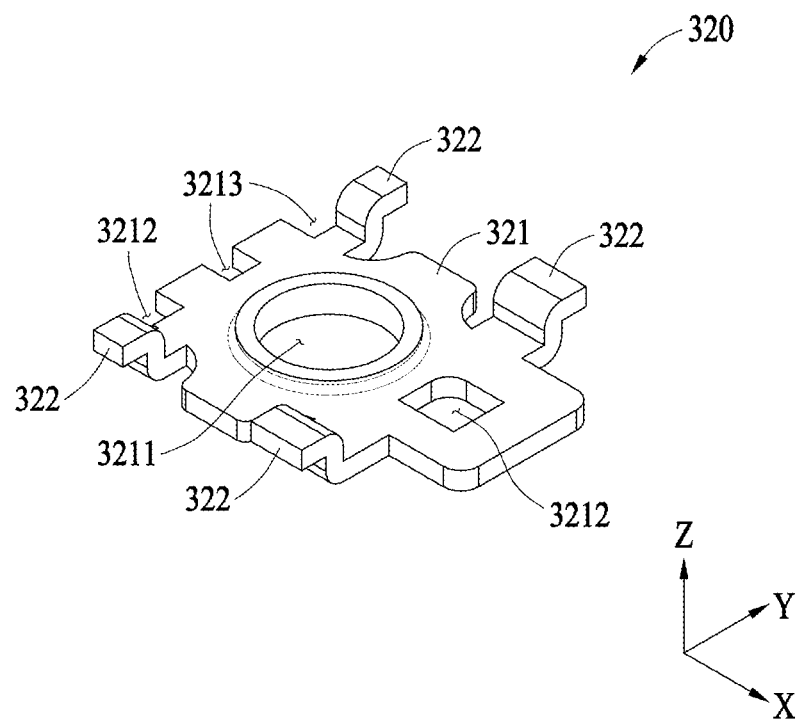
FIG. 3E is a plan view illustrating a second sliding member according to an example embodiment.

FIG. 3D is a perspective view illustrating a second sliding member according to one embodiment. FIG. 3E is a plan view illustrating a second sliding member according to one embodiment.

Referring to FIGS. 3A, 3D, and 3E, the second sliding member 320 according to one embodiment may include a second main body 321 and a second extension body 322.

In one embodiment, the second main body 321 may be provided substantially in a plate shape or a block shape. The second main body 321 may be seated on the other side (e.g., the +z direction side) of the second hole 2222. A width (e.g., a y-directional length) of the second main body 321 may substantially correspond to the gap (e.g., a gap in the y direction) between the rails 2223, or may be less than the gap (e.g., a gap in the y direction) between the rails 2223. A length (e.g., an x-directional length) of the second main body 321 may be less than the length (e.g., the x-directional length) of the second hole 2222 by a designated length.

In one embodiment, a second through-hole 3211 may be formed in the second main body 321. For example, the second through-hole 3211 may be formed through the second main body 321 in one direction (e.g., the z direction). For example, the second through-hole 3211 may be formed in a central portion of the second main body 321. In a state in which the first sliding member 310 and the second sliding member 320 are coupled to each other, the second through-hole 3211 may be formed in a position corresponding to a first through-hole (e.g., the first through-hole 3111 of FIG. 3B). The second through-hole 3211 may be a hole through which the fastening member 330 passes. For example, a screw thread for coupling with the fastening member 330 may be formed on an inner circumferential surface of the second through-hole 3211. For example, the second through-hole 3211 may be formed by forming a tab through burring in the second main body 321.

In one embodiment, a hook insertion hole 3212 may be formed in the second main body 321. For example, the hook insertion hole 3212 may be formed through the second main body 321 in one direction (e.g., the z direction). The hook insertion hole 3212 may be a hole into which a second hook portion (e.g., the second hook portion 314 of FIG. 3C) of the first sliding member 310 is inserted and fastened. The hook insertion hole 3212 may be formed in a position corresponding to the second hook portion 314, and a number of hook insertion holes 3212 may correspond to a number of second hook portions 314. For example, two hook insertion holes 3212 may be formed. In this example, one hook insertion hole 3212 may be formed on one side (e.g., a +x direction side) of the second main body 321, and the other hook insertion hole 3212 may be formed on the other side (e.g., a −x direction side) of the second main body 321.

In one embodiment, an alignment hole 3213 may be formed in the second main body 321. For example, the alignment hole 3213 may be formed through the second main body 321 in one direction (e.g., the z direction). The alignment hole 3213 may be a hole into which an aligning protrusion (e.g., the aligning protrusion 315 of FIG. 3C) of the first sliding member 310 is inserted. The alignment hole 3213 may be formed in a position corresponding to the aligning protrusion 315, and a number of alignment holes 3213 may correspond to a number of aligning protrusions 315. For example, two alignment holes 3213 may be formed. The two alignment holes 3213 may be spaced apart from each other on the other end portion (e.g., the end portion in the −x direction) of the second main body 321. The alignment hole 3213 may be formed in a shape and size substantially corresponding to those of the aligning protrusion 315.

In one embodiment, the second extension body 322 may extend from each of both sides (e.g., a −x direction side and a +x direction side) of the second main body 321. At least one pair of second extension bodies 322 may be formed. For example, two pairs of second extension bodies 322 may be formed. For example, the two pairs of second extension bodies 322 may be spaced apart from each other in a longitudinal direction (e.g., the x direction) of the second main body 321. The second extension body 322 may be bent in the first direction D1 (e.g., the +z direction) to have a height difference from the second main body 321. For example, the second extension body 322 may extend from both sides (e.g., the −y direction side or the +y direction side) of the second main body 321 in the first direction D1 (e.g., the +z direction), may be bent and may extend in a direction (e.g., the −y direction or the +y direction). However, this is merely an example and a shape of the second extension body 322 is not limited thereto.

Figure 4A:
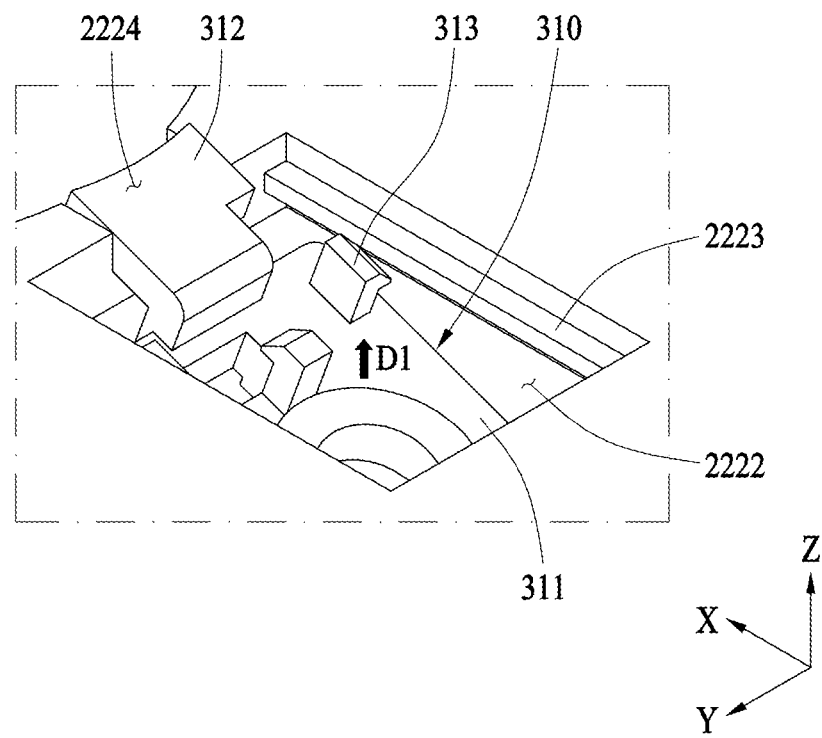
FIGS. 4A to 4D illustrate a process in which a sliding assembly according to an example embodiment is installed in a second hole.
Figure 4B:
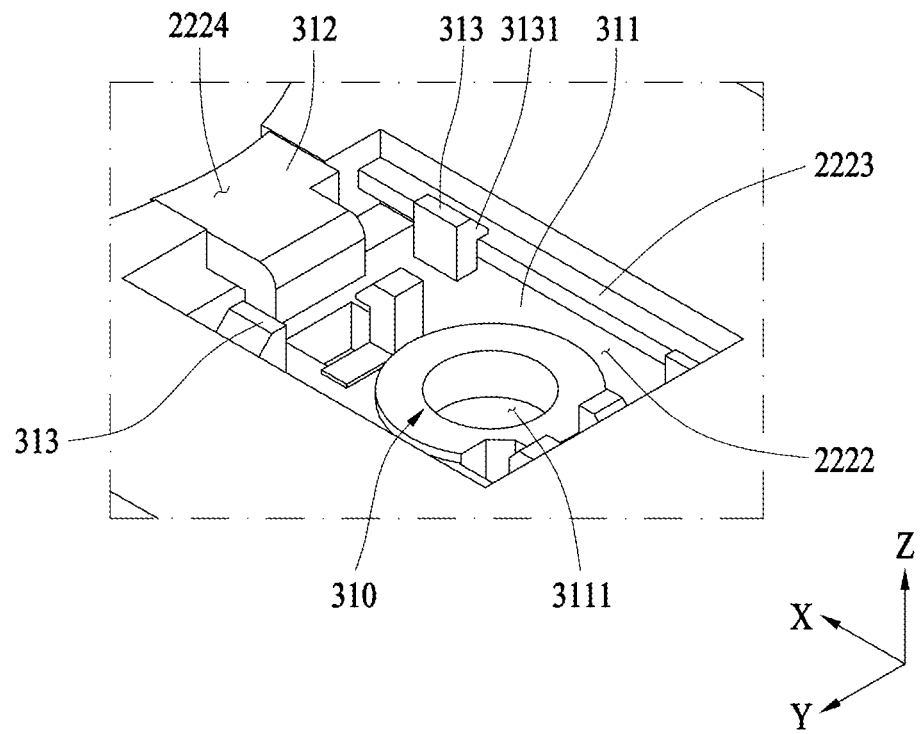
Figure 4C:
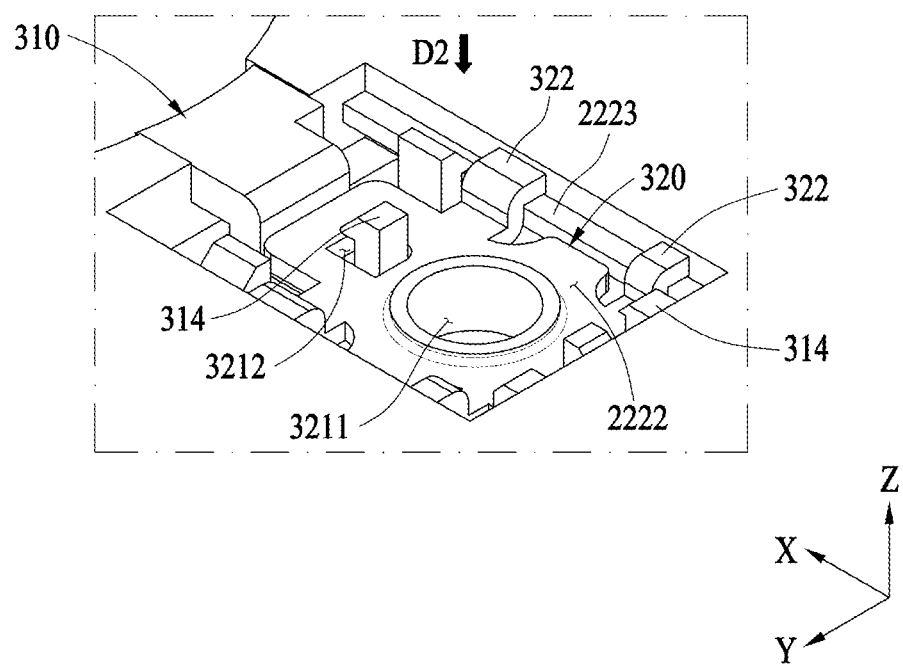
Figure 4D:
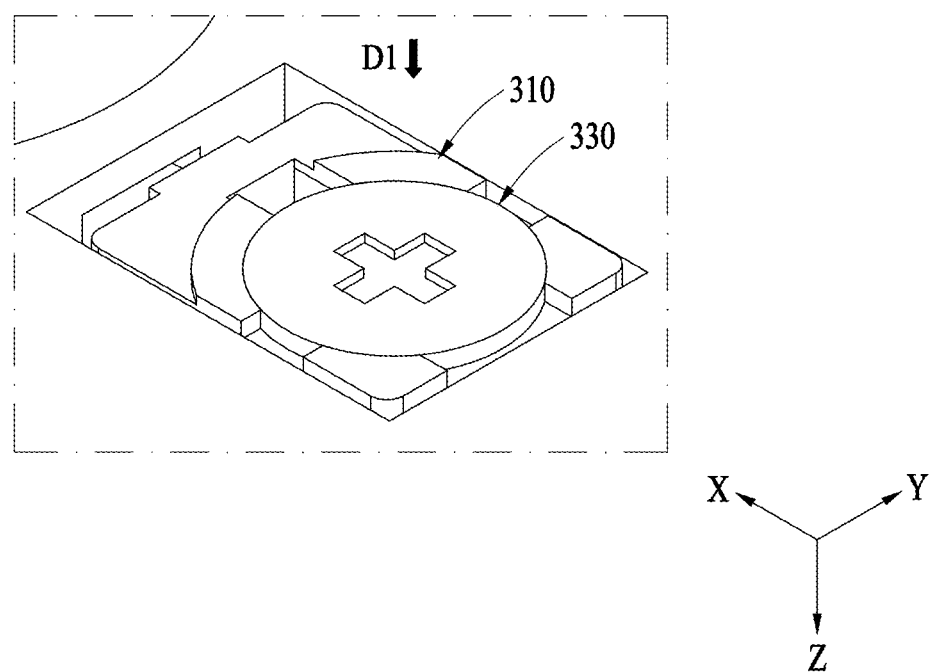

FIGS. 4A to 4D illustrate a process in which a sliding assembly according to one embodiment is installed in a second hole. Specifically, FIGS. 4A and 4B are perspective views illustrating a process in which the first sliding member is installed in the second hole in one embodiment, FIG. 4C is a perspective view illustrating a state in which a second sliding member is installed in the second hole in one embodiment, and FIG. 4D is a rear perspective view illustrating a state in which a fastening member is fastened in one embodiment.

Referring to FIGS. 4A and 4B, in one embodiment, the first sliding member 310 may be inserted into the second hole 2222 in the first direction D1 (e.g., the +z direction). For example, in a state in which the first extension body 312 is seated on the communication hole 2224, the first main body 311 may be inserted into the second hole 2222 in the first direction D1 until the hook head 3131 of the first hook portion 313 is caught in the rail 2223. Referring to FIG. 4B, the first extension body 312 may be seated in the communication hole 2224, and the rail 2223 may be positioned between the flange 3113 and the hook head 3131 of the first hook portion 313, and accordingly the first sliding member 310 may be installed in the second hole 2222.

Referring to FIG. 4C, in one embodiment, the second sliding member 320 may be inserted into the second hole 2222 in the second direction D2 (e.g., the −z direction). For example, in a state in which the first sliding member 310 is installed in the second hole 2222, the second sliding member 320 may be inserted into the second hole 2222 in the second direction D2 until the second hook portion 314 is inserted into the hook insertion hole 3212. In a state shown in FIG. 4C, the second sliding member 320 may be coupled to the first sliding member 310 by the second hook portion 314, and a surface (e.g., a surface in the −z direction) of the second extension body 322 facing the second direction D2 may be seated on the rail 2223. In a state in which the first sliding member 310 and the second sliding member 320 are coupled to each other, the second through-hole 3211 may communicate with a first through-hole (e.g., the first through-hole 3111 of FIG. 4B).

Referring to FIG. 4D, in a state in which the first sliding member 310 and a second sliding member (e.g., the second sliding member 320 of FIG. 4C) are individually installed in the second hole 2222 and are coupled to each other, the fastening member 330 may be inserted into a first through-hole (e.g., the first through-hole 3111 of FIG. 4B) and a second through-hole (e.g., the second through-hole 3211 of FIG. 4C) in the first direction D1 (e.g., the +z direction). For example, the fastening member 330 may be fastened through a screw thread formed in the second through-hole 3211.

Figure 5A:
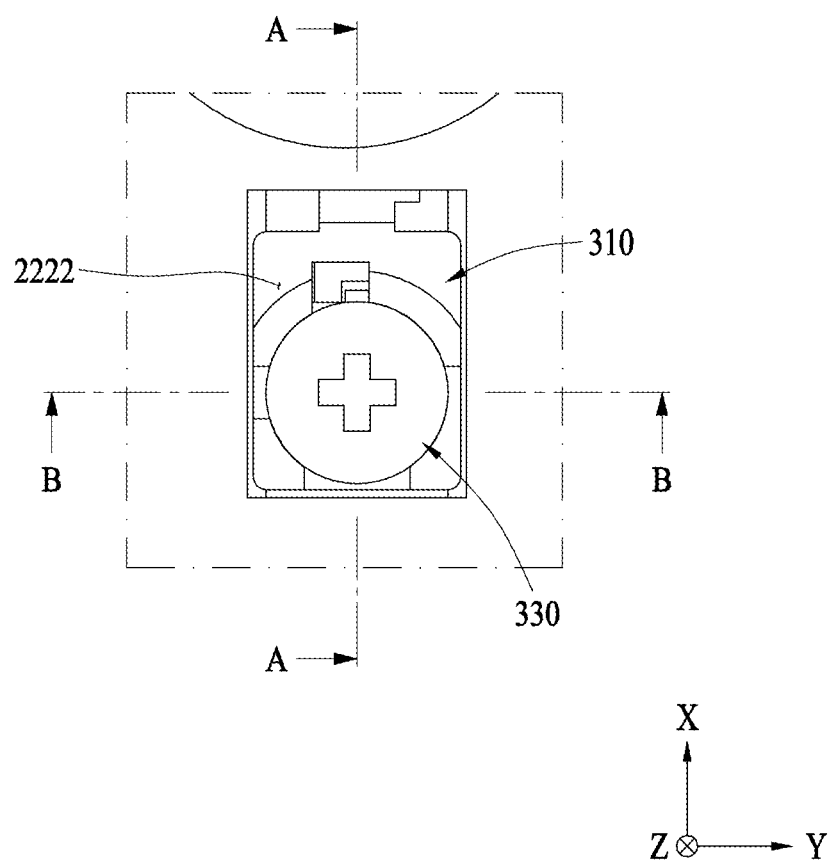
FIG. 5A is a plan view illustrating a state in which a sliding assembly is installed in a second hole in an example embodiment.
Figure 5B:
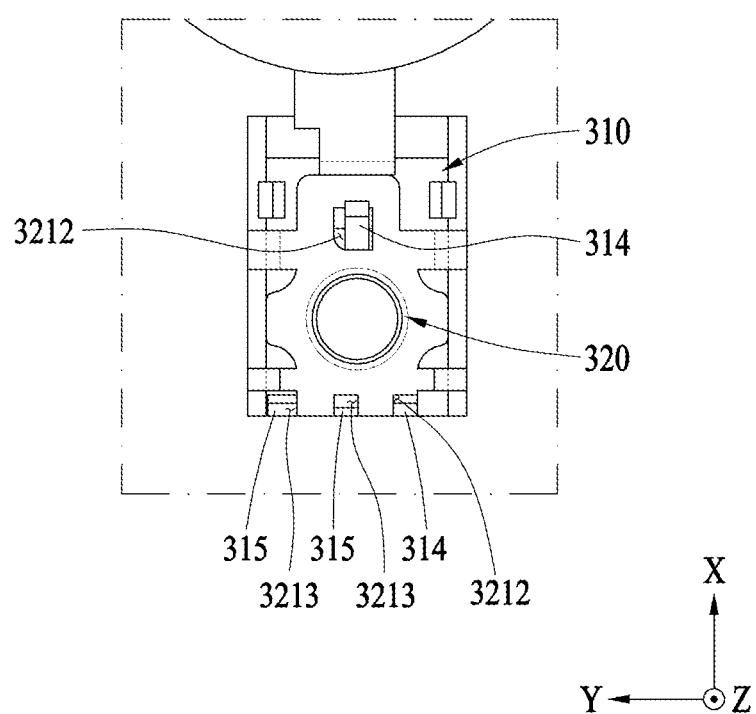
FIG. 5B is a rear view illustrating a state in which a sliding assembly is installed in a second hole in an example embodiment.
Figure 5C:
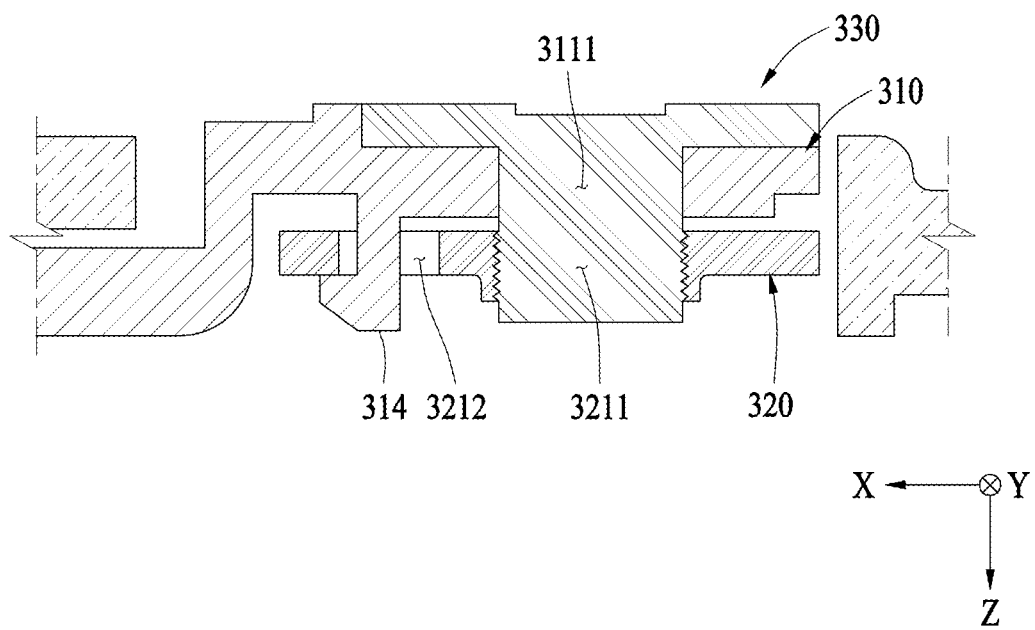
FIG. 5C is a cross-sectional view taken along line A-A of FIG. 5A.
Figure 5D:
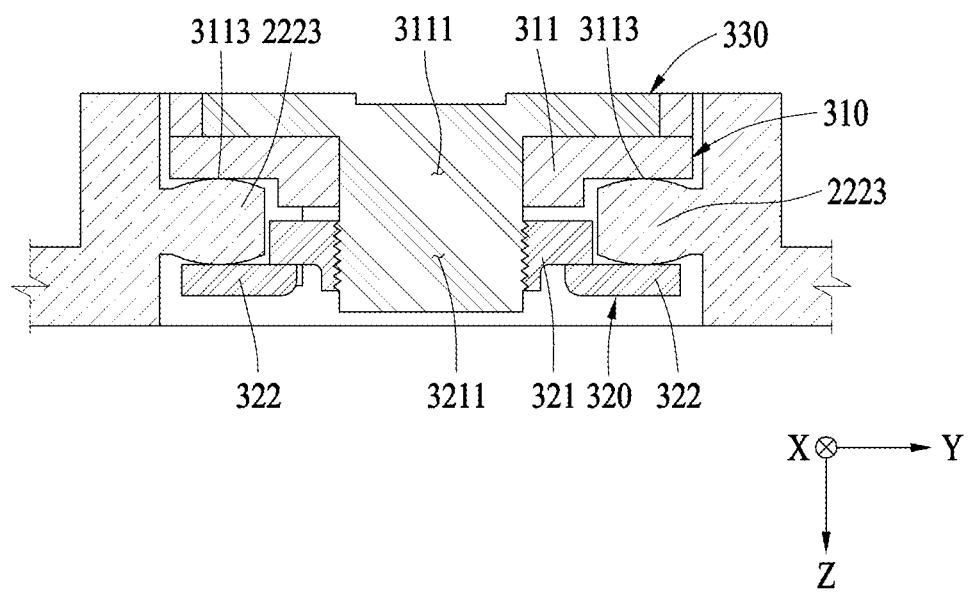
FIG. 5D is a cross-sectional view taken along line B-B of FIG. 5A.

FIG. 5A is a plan view illustrating a state in which a sliding assembly is installed in a second hole in one embodiment. FIG. 5B is a rear view illustrating a state in which the sliding assembly is installed in the second hole in one embodiment. FIG. 5C is a cross-sectional view taken along line A-A of FIG. 5A. FIG. 5D is a cross-sectional view taken along line B-B of FIG. 5A.

Referring to FIGS. 5A and 5B, in one embodiment, the sliding assembly 300 may be installed in the second hole 2222 to be slidable along the rail 2223. The second hook portion 314 may be inserted into the hook insertion hole 3212, so that the first sliding member 310 and the second sliding member 320 may be coupled to each other. The aligning protrusion 315 of the first sliding member 310 may be inserted into the alignment hole 3213 of the second sliding member 320 and positioned, so that relative positions of the first sliding member 310 and the second sliding member 320 may be aligned. For example, the aligning protrusion 315 may be inserted into the alignment hole 3213 and positioned, to prevent or reduce a rotational movement (e.g., a rotation about a z-axis) and/or a translational movement (e.g., a translational movement in the x direction or the y direction) of the second sliding member 320 with respect to the first sliding member 310.

In one embodiment, the fastening member 330 may be installed through the first through-hole 3111 and the second through-hole 3211, so that the first sliding member 310 and the second sliding member 320 may be fastened to each other. The rail 2223 may be positioned between the flange 3113 of the first sliding member 310 and the second extension body 322 of the second sliding member 320. The first main body 311 of the first sliding member 310 and the second main body 321 of the second sliding member 320 may be positioned to be spaced apart from each other. Based on the above structure, the fastening strength (e.g., a degree of rotation of a screw thread of the fastening member 330) of the fastening member 330 may be adjusted, and accordingly a separation distance between the flange 3113 and the second extension body 322 may be adjusted. For example, when the fastening member 330 is strongly fastened, the separation distance between the flange 3113 and the second extension body 322 may be reduced, a strong frictional force may be generated between the rail 2223 and each of the flange 3113 and the second extension body 322. Thus, in such a state, sliding of the first sliding member 310 and the second sliding member 320 along the rail 2223 may be limited. As a result, the fastening member 330 may perform a function of fixing relative positions of the first sliding member 310 and the second sliding member 320 along the rail 2223. If sliding of the sliding assembly 300 with respect to the rail 2223 is required, the separation distance between the flange 3113 and the second extension body 322 may be increased by unfastening the fastening member 330. For example, when the screw thread of the fastening member 330 is unscrewed by a predetermined pitch, a frictional force between the rail 2223 and each of the flange 3113 and the second extension body 322 may be relatively reduced so that the flange 3113 and the second extension body 322 may be slidable along the rail 2223. As a result, the sliding assembly 300 may be slidable along the rail 2223.

In one embodiment, a surface of the rail 2223 may be a curved surface. For example, a surface (e.g., a surface in the −z direction and/or +z direction) of the rail 2223 in contact with the flange 3113 and/or the second extension body 322 may protrude and may be formed as a curved surface. Based on the above structure, the rail 2223 may be in line contact (e.g., a line contact in the x direction) with the flange 3113 and/or the second extension body 322. Thus, a frictional resistance generated when the flange 3113 and/or the second extension body 322 slides in contact with the rail 2223 may be reduced.

Figure 6A:
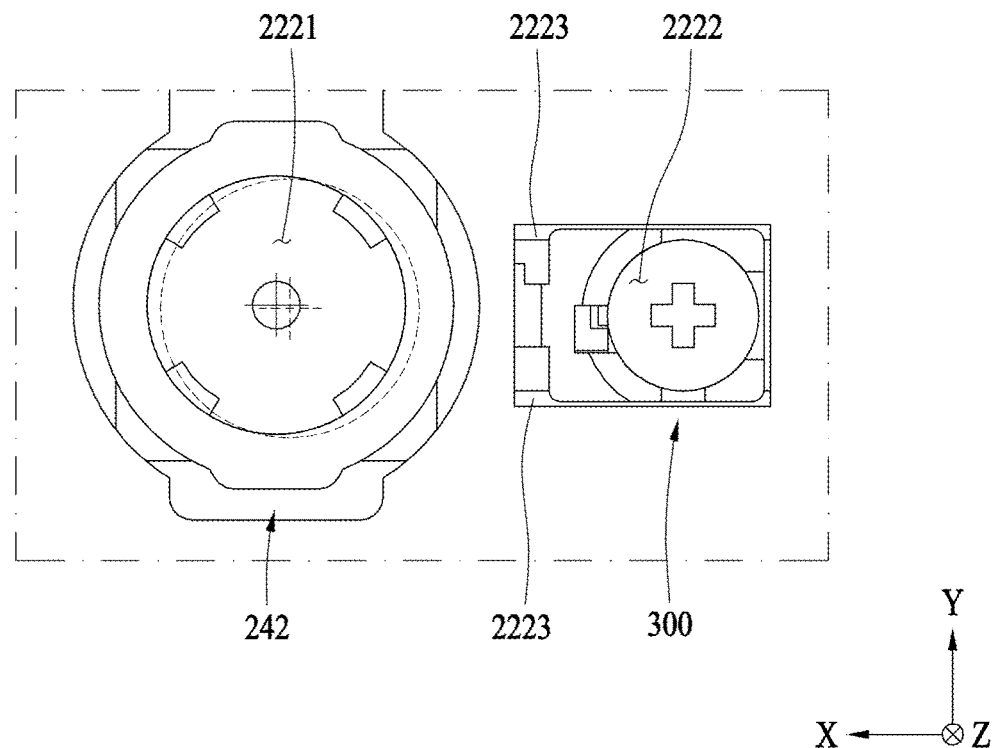
FIG. 6A is a plan view illustrating an initial installation state of a sliding assembly according to an example embodiment.
Figure 6B:
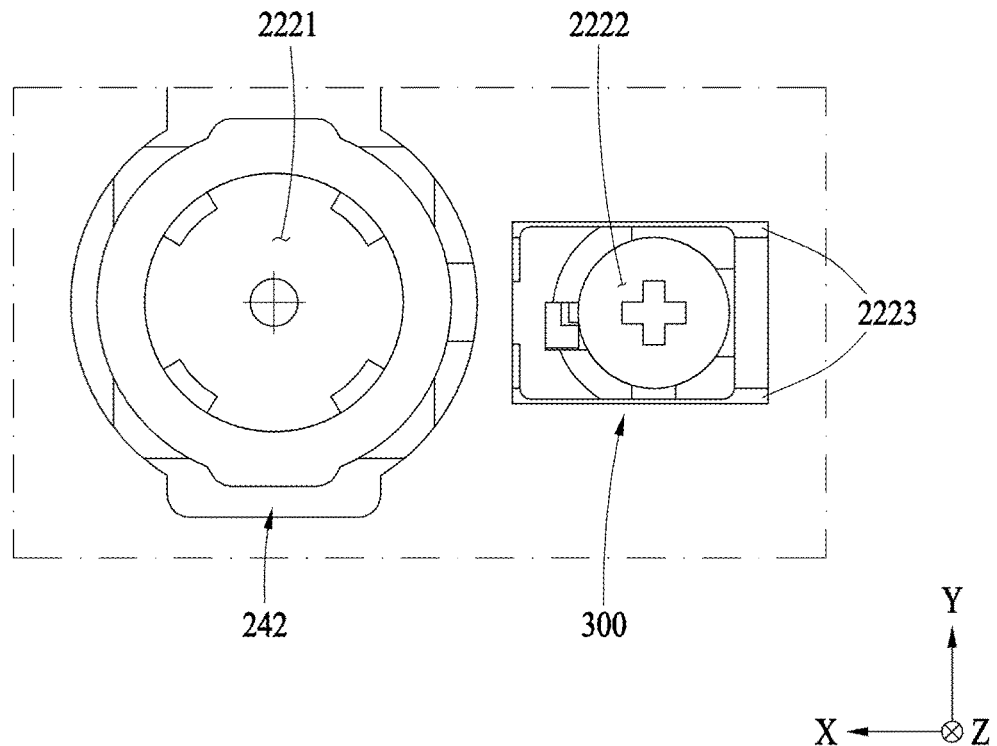
FIG. 6B is a plan view illustrating a state in which a position of a second camera module is adjusted using a sliding assembly according to an example embodiment.
Figure 6C:
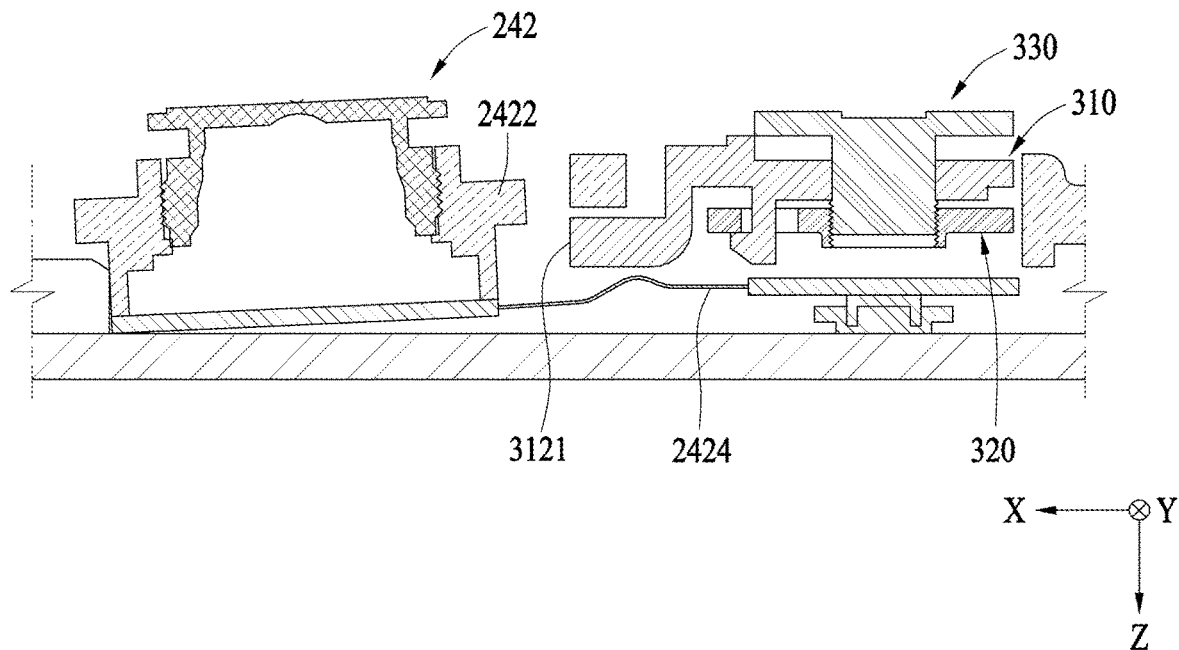
FIGS. 6C to 6E are cross-sectional views illustrating a process of adjusting a position of a second camera module using a sliding assembly according to an example embodiment.
Figure 6D:
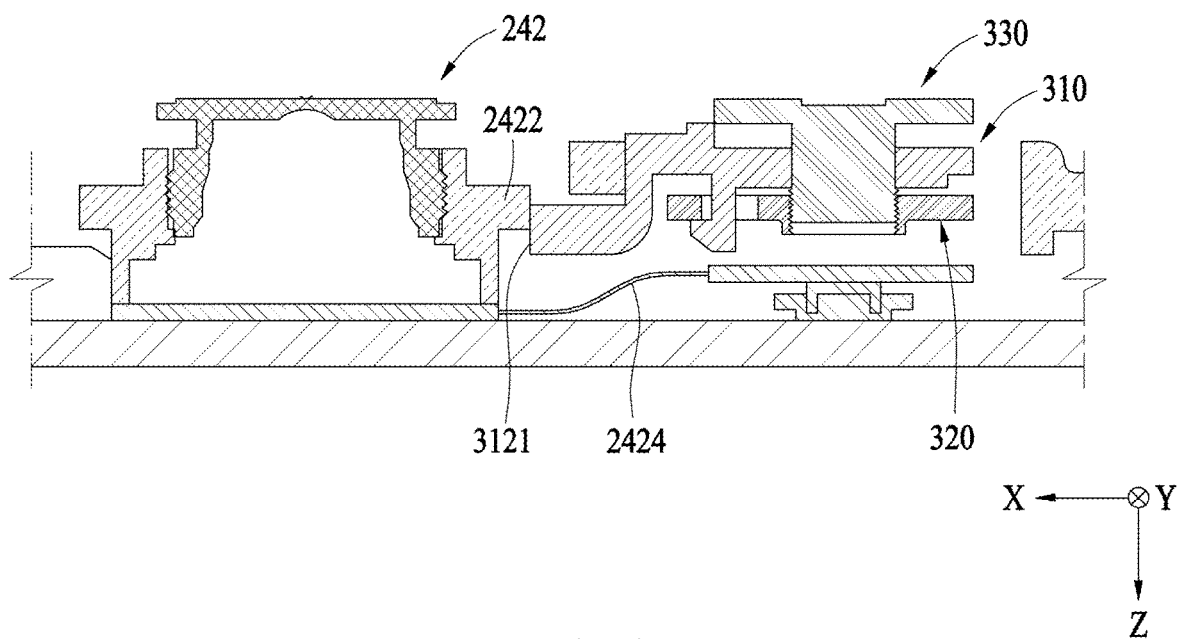
Figure 6E:
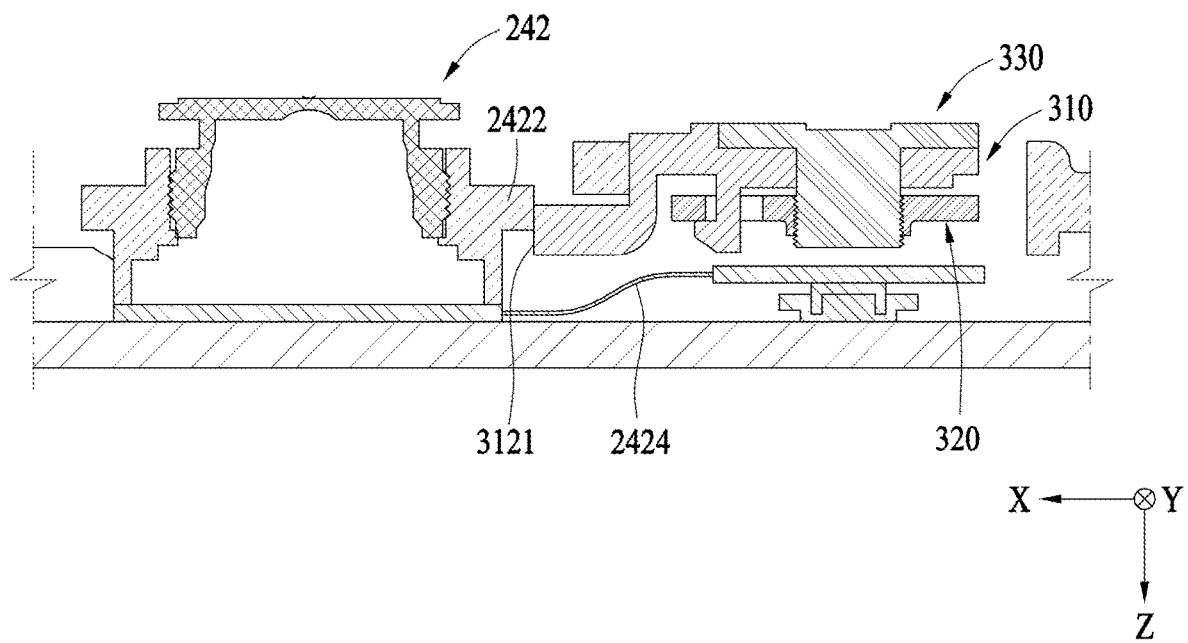

FIG. 6A is a plan view illustrating an initial installation state of a sliding assembly according to one embodiment. FIG. 6B is a plan view illustrating a state in which a position of a second camera module is adjusted using the sliding assembly according to one embodiment. FIGS. 6C to 6E are cross-sectional views illustrating a process of adjusting the position of the second camera module using the sliding assembly according to one embodiment.

Referring to FIGS. 6A to 6E, in one embodiment, the second camera module 242 may be tilted and/or decentered in an initial installation process. For example, as shown in FIG. 6C, the second camera module 242 may be tilted with respect to a central axis by tension applied by the FPCB 2424 connected (directly or indirectly) to the second camera module 242. For example, a side (e.g., a −x direction side) of the second camera module 242 connected (directly or indirectly) to the FPCB 2424 may be lifted relatively upwards (e.g., toward a −z direction side). However, this is merely an example, and a state in which the second camera module 242 is tilted and/or decentered is not limited thereto. If the second camera module 242 is tilted, the second camera module 242 may be decentered. For example, as shown in FIG. 6A, a central portion of the second camera module 242 may deviate from a reference position. For example, such decentering may be detected through a contrast with a reference hole of a vision inspector.

In one embodiment, when tilting and/or decentering of the second camera module 242 is detected, an installation state of the second camera module 242 may be adjusted through the movement of the sliding assembly 300. In an initial state, the sliding assembly 300 may be installed in the second hole 2222 such that the first sliding member 310 may be spaced apart from the second camera module 242. For example, as shown in FIG. 6A, in the initial state, the sliding assembly 300 may be installed in a position (e.g., a position on the −x direction side) far from the first hole 2221 in the second hole 2222. For example, in the initial state, the contact end portion 3121 of the first sliding member 310 may be spaced apart from the second camera module 242. To slide the sliding assembly 300, the fastening member 330 may be unfastened. For example, as shown in FIG. 6C, the screw thread of the fastening member 330 may be unscrewed by a predetermined pitch. In a state in which the fastening member 330 is unfastened, the sliding assembly 300 may slide toward the second camera module 242 along the rail 2223 as shown in FIGS. 6A-6B and 6D. For example, a shoulder (e.g., the shoulder 3112 of FIG. 3B) of the first sliding member 310 may be pushed toward the second camera module 242, so that the sliding assembly 300 may be slid. In the above process, the contact end portion 3121 of the first sliding member 310 may come into contact with a portion (e.g., the barrel 2422) of the second camera module 242. The sliding assembly 300 may slide toward the second camera module 242 in a state in which the contact end portion 3121 is in contact with one side (e.g., the −x direction side) of the second camera module 242, to support the one side (e.g., the −x direction side) of the second camera module 242, thereby correcting the tilting and/or decentering of the second camera module 242. For example, the contact end portion 3121 of the sliding assembly 300 may press and support one side (e.g., the −x direction side) of the second camera module 242 which is lifted relatively upwards (e.g., toward a −z direction side), thereby correcting the tilting and/or decentering of the second camera module 242. For example, a sliding distance of the sliding assembly 300 may be adjusted according to a degree to which the second camera module 242 is tilted and/or decentered. If an adjustment of the installation state of the second camera module 242 is completed, the position of the sliding assembly 300 may be fixed to the second hole 2222 by the fastening member 330. For example, as shown in FIG. 6E, as the fastening member 330 is maximally or largely fastened, sliding of the sliding assembly 300 along the rail 2223 may be limited, so that the position of the sliding assembly 300 may be fixed to the second hole 2222. Based on the above configuration, the tilting and/or decentering of the second camera module 242 may be detected in advance, and the installation state of the second camera module 242 may be adjusted in advance. If the adjustment of the installation state of the second camera module 242 is completed, a second plate (e.g., the second plate 212 of FIG. 2C) may be assembled.

Although the sliding assembly 300 according to one embodiment is illustrated and described based on the second camera module 242, this is merely an example, and the sliding assembly 300 may be applied to various camera modules. For example, the sliding assembly 300 may also be applied to a first camera module (e.g., the first camera module 241 of FIG. 2A).

Figure 7A:
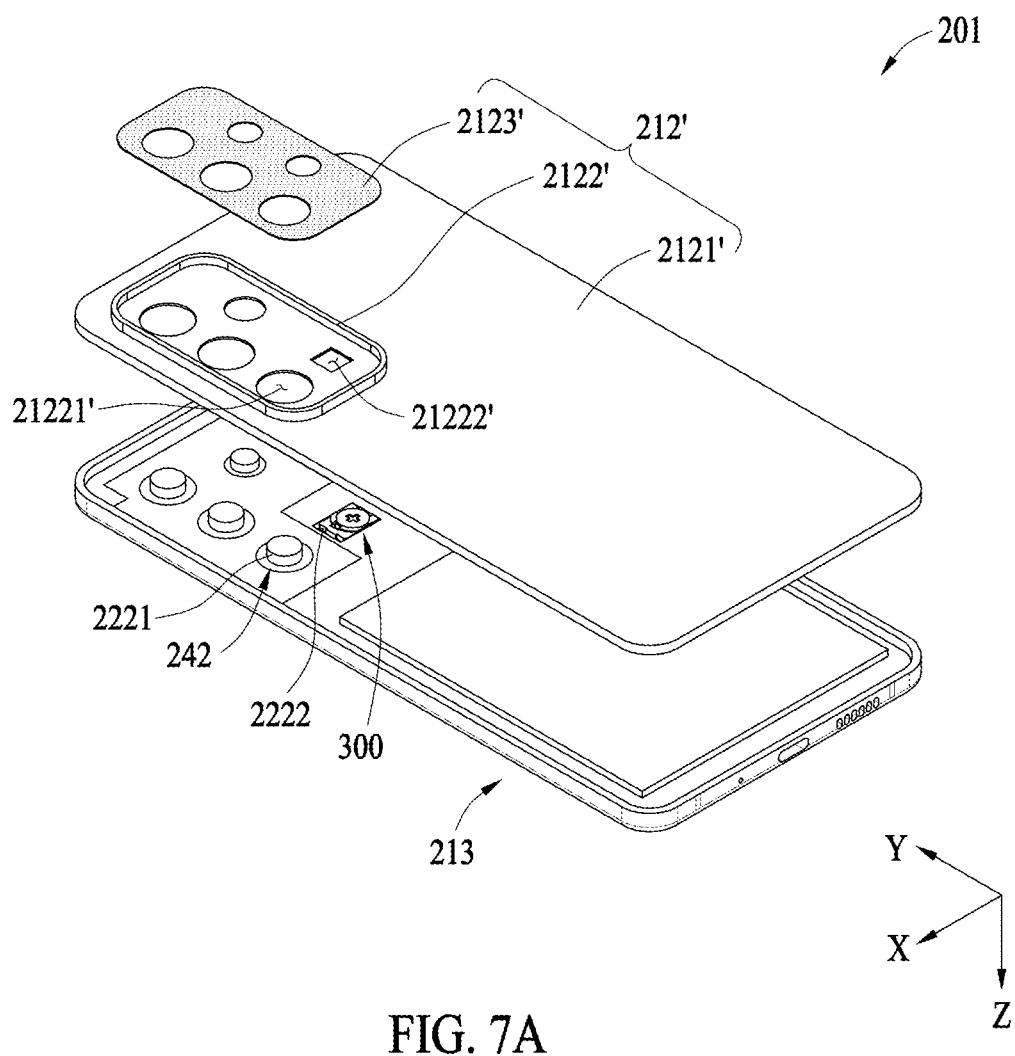
FIG. 7A is an exploded perspective view of an electronic device according to an example embodiment.
Figure 7B:
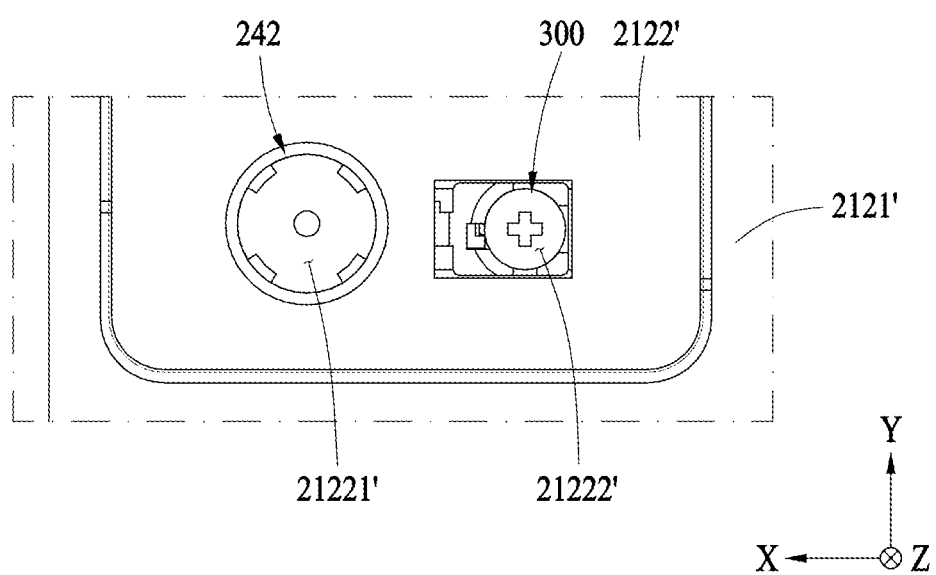
FIG. 7B is a plan view illustrating a state in which a camera window is not assembled in an electronic device according to an example embodiment.

FIG. 7A is an exploded perspective view of an electronic device according to one embodiment. FIG. 7B is a plan view illustrating a state in which a camera window is not assembled in an electronic device according to one embodiment.

Referring to FIGS. 7A and 7B, in a second plate 212' of the electronic device 201 according to one embodiment, windows for each camera module (e.g., the second camera module 242) may be integrally formed. For example, the second plate 212' according to one embodiment may include a cover plate 2121', a window arrangement portion 2122', and a camera window 2123'.

In one embodiment, the cover plate 2121' may be formed in a plate shape and may form an exterior of the second plate 212'. The cover plate 2121' may be connected to the side member 213 to cover a support member (e.g., the support member 220 of FIG. 2C) on a rear surface (e.g., a surface in the −z direction) of the support member 220. The window arrangement portion 2122' may be positioned on the rear surface (e.g., a surface in the −z direction) of the cover plate 2121'. For example, the window arrangement portion 2122' may be positioned to cover the second camera module 242. The window arrangement portion 2122' may provide a space for an arrangement of the camera window 2123'. For example, the window arrangement portion 2122' may include a camera decoration portion. The camera window 2123' may be formed of a transparent or translucent material. The camera window 2123' may be disposed on the window arrangement portion 2122'.

In one embodiment, a third hole 21221' and a fourth hole 21222' may be formed in the window arrangement portion 2122'. Based on a state in which the cover plate 2121' is connected to the side member 213, the third hole 21221' may be formed at a position substantially corresponding to the first hole 2221. Based on the state in which the cover plate 2121' is connected to the side member 213, the fourth hole 21222' may be formed at a position substantially corresponding to the second hole 2222. Based on the above configuration, in the state in which the cover plate 2121' is connected to the side member 213, the second camera module 242 may be exposed through the third hole 21221', and the sliding assembly 300 may be exposed through the fourth hole 21222'. Accordingly, in the state in which the cover plate 2121' is connected to the side member 213, the installation state of the second camera module 242 may be adjusted through the movement of the sliding assembly 300 exposed through the fourth hole 21222'. If the adjustment of the installation state of the second camera module 242 is completed, the camera window 2123' may be coupled to the window arrangement portion 2122'.

Figure 8A:
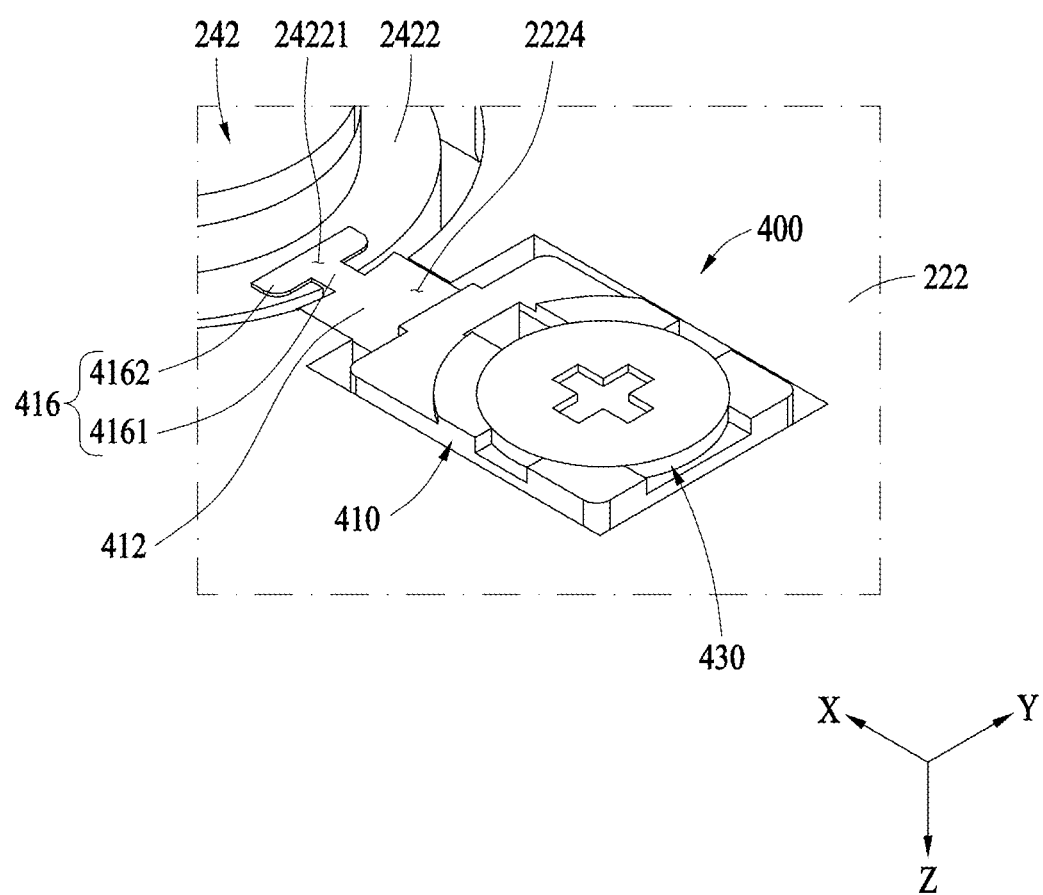
FIG. 8A is a perspective view illustrating a state in which a sliding assembly according to an example embodiment is installed.
Figure 8B:
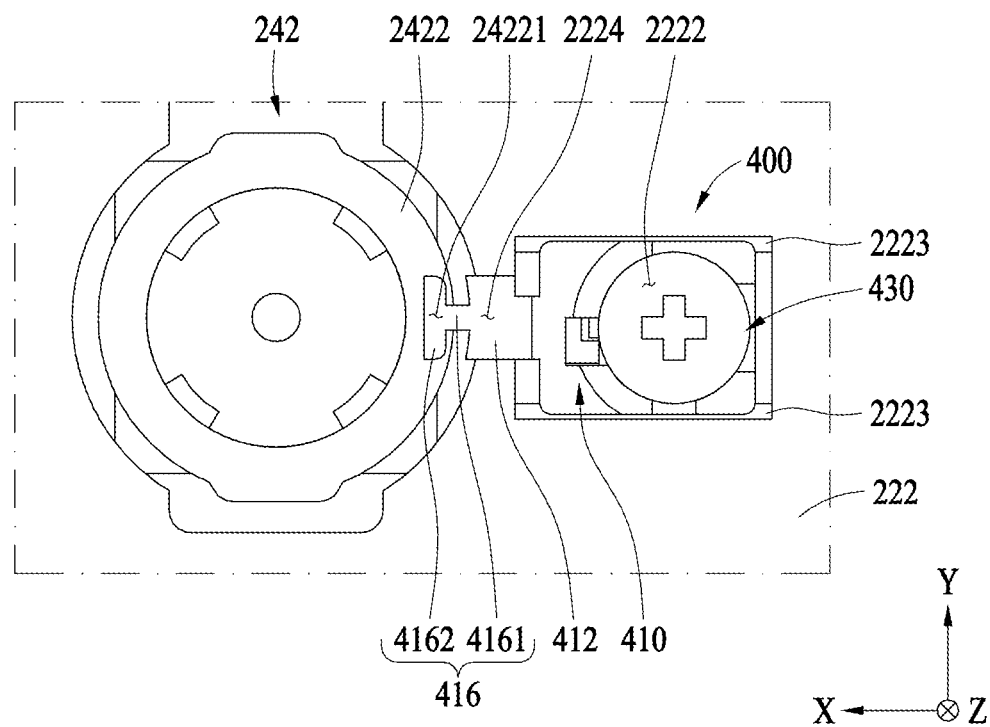
FIG. 8B is a plan view illustrating a state in which a sliding assembly according to an example embodiment is installed.

FIG. 8A is a perspective view illustrating a state in which a sliding assembly according to one embodiment is installed. FIG. 8B is a plan view illustrating the state in which the sliding assembly according to one embodiment is installed. FIGS. 8C to 8F are cross-sectional views illustrating a process of adjusting a position of a second camera module using the sliding assembly according to one embodiment.

Referring to FIGS. 8A to 8F, a sliding assembly 400 according to one embodiment may include a first sliding member 410, a second sliding member 420, and a fastening member 430.

In one embodiment, the first sliding member 410 may include an insertion body 416 extending from a first extension body 412. For example, the insertion body 416 may extend from the first extension body 412 toward the first hole 2221. For example, the insertion body 416 may extend in the +x direction. The insertion body 416 may include a first insertion body 4161 and a second insertion body 4162. The first insertion body 4161 may extend from the first extension body 412 by a first width (e.g., a y-directional length), and the second insertion body 4162 may extend from the first insertion body 4161 by a second width (e.g., a y-directional length) that is greater than the first width. For example, as shown in FIGS. 8A and 8B, the insertion body 416 may be formed substantially in a "T" shape. However, this is merely an example, and a shape of the insertion body 416 is not limited thereto.

In one embodiment, an insertion groove 24221 for insertion of at least a portion of the insertion body 416 of the first sliding member 410 may be formed in the barrel 2422 of the second camera module 242. The insertion groove 24221 may be formed such that an upper side (e.g., the −z direction side) may be opened. The insertion groove 24221 may be formed in a shape corresponding to that of at least a portion of the insertion body 416. For example, the insertion groove 24221 may have a shape corresponding to those of the first insertion body 4161 and the second insertion body 4162. For example, the insertion groove 24221 may be formed substantially in a "T" shape. However, this is merely an example, and a shape of the insertion groove 24221 is not limited thereto.

In one embodiment, the communication groove 2224 of the second support member 222 may be formed to penetrate the second support member 222 in one direction (e.g., the z-direction).

Figure 8C:
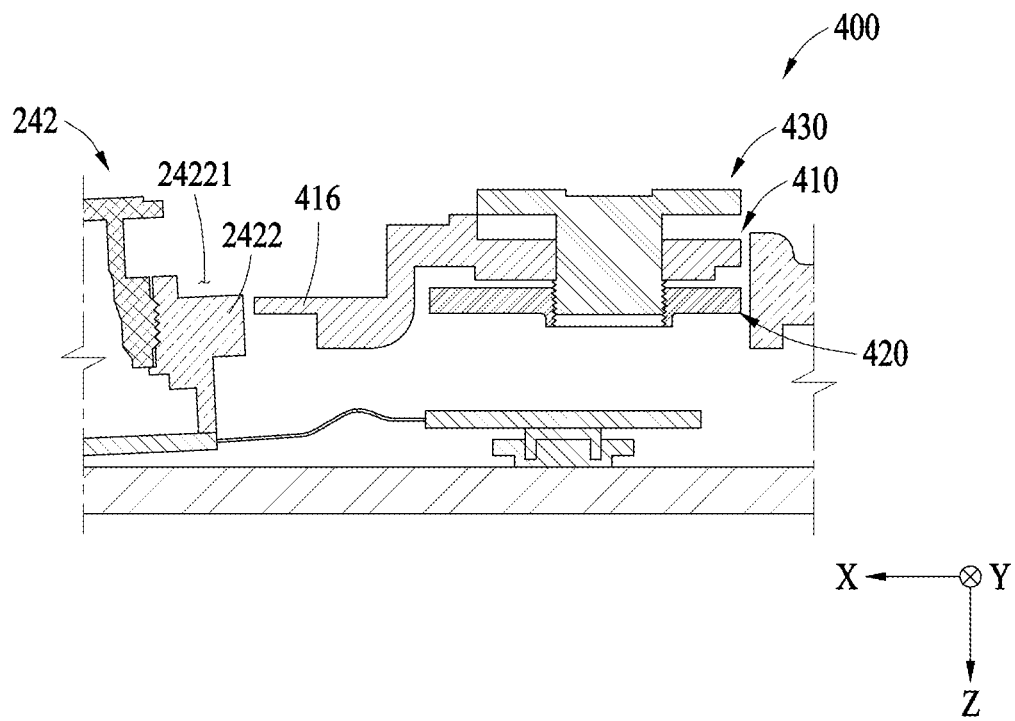
FIGS. 8C to 8F are cross-sectional views illustrating a process of adjusting a position of a second camera module using a sliding assembly according to an example embodiment.
Figure 8D:
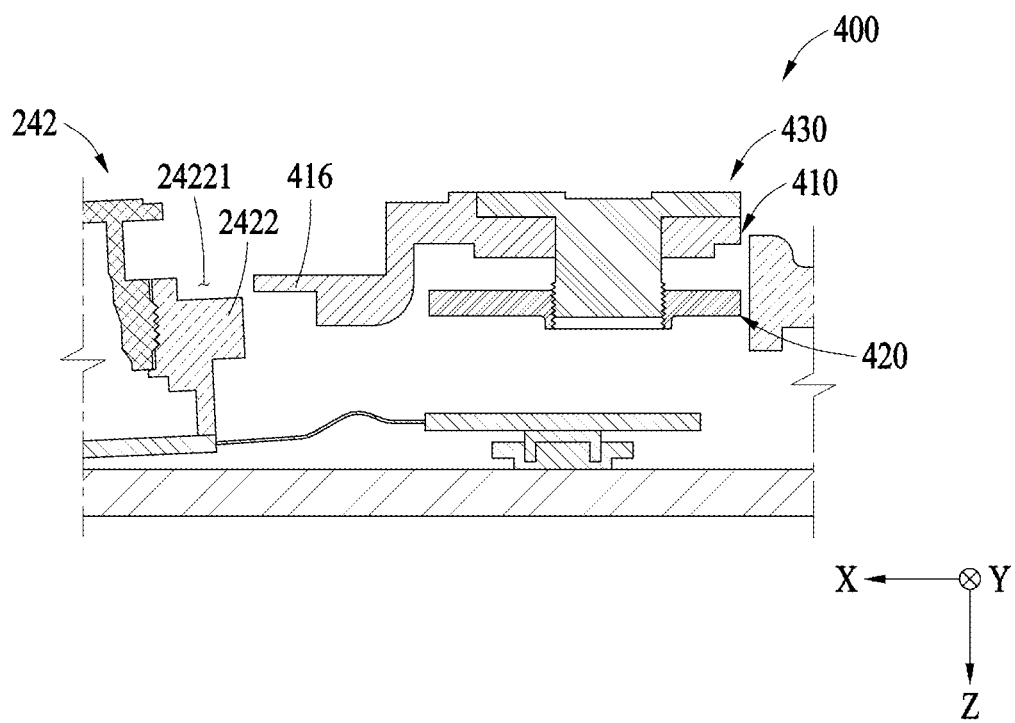
Figure 8E:
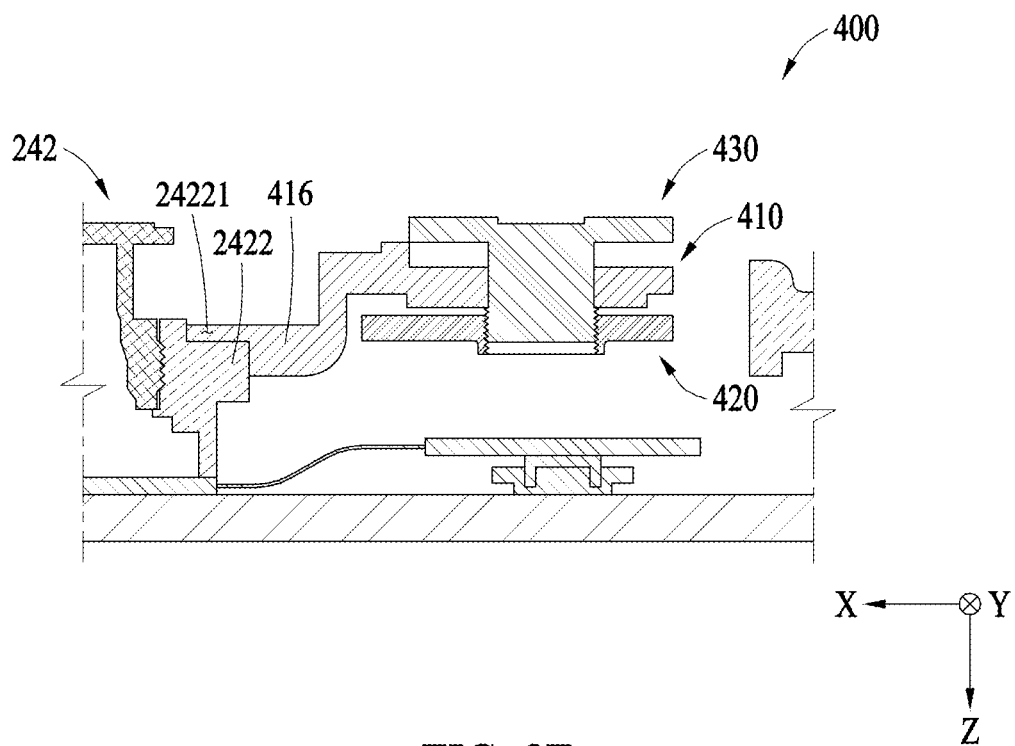
Figure 8F:
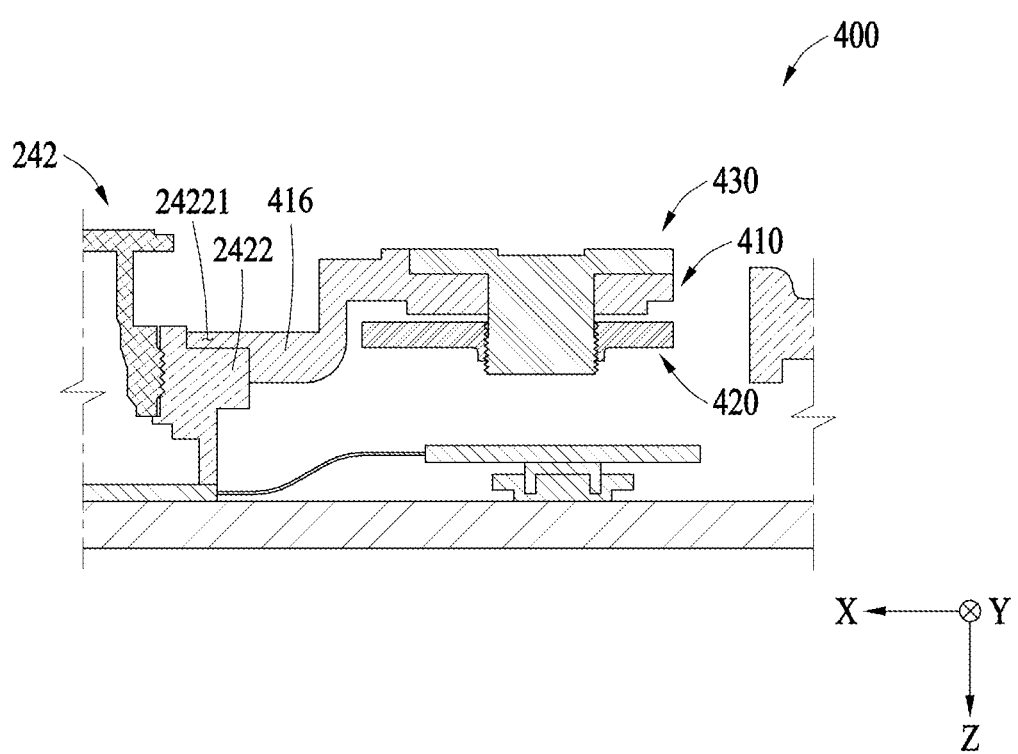

In one embodiment, if tilting and/or decentering of the second camera module 242 is detected, the installation state of the second camera module 242 may be adjusted through a movement of the sliding assembly 400. In an initial state, the sliding assembly 400 may be installed in the second hole 2222 such that the first sliding member 410 may be spaced apart from the second camera module 242. For example, as shown in FIG. 8C, in the initial state, the sliding assembly 400 may be installed in a position (e.g., a position on the −x direction side) far from the first hole 2221 in the second hole 2222. For example, in the initial state, the insertion body 416 of the first sliding member 410 may be spaced apart from the second camera module 242. To slide the sliding assembly 400, the fastening member 430 may be unfastened. For example, as shown in FIG. 8C, a screw thread of the fastening member 430 may be unscrewed by a predetermined pitch. In a state in which the fastening member 430 is unfastened, the first sliding member 410 may be moved relatively upwards (e.g., in the −z direction) with respect to the second sliding member 420, as shown in FIG. 8D. For example, the first sliding member 410 may be lifted to a height enough to allow the insertion body 416 to be inserted into the insertion groove 24221. In such a state, the sliding assembly 400 may be moved toward the second camera module 242 along the rail 2223 (e.g., in the +x direction) and subsequently moved downwards (e.g., in the +z direction), so that the insertion body 416 may be inserted into the insertion groove 24221. For example, in a state in which the insertion body 416 is inserted into the insertion groove 24221, as shown in FIG. 8E, the second camera module 242 may be supported while an upper side (e.g., a −z direction side) is being pressed by the sliding assembly 400, and accordingly the installation state of the second camera module 242 may be improved. In addition, the sliding assembly 400 may slide along the rail 2223 in the state in which the insertion body 416 is inserted into the insertion groove 24221, so that the installation state of the second camera module 242 may be precisely adjusted. For example, the sliding assembly 400 may slide in a direction (e.g., the +x direction) close to the second camera module 242, or slide in a direction (e.g., the −x direction) away from the second camera module 242 in the state in which the insertion body 416 is inserted into the insertion groove 24221, so that the installation state of the second camera module 242 may be precisely adjusted. For example, a sliding direction and/or a movement distance of the sliding assembly 400 may be adjusted according to the degree to which the second camera module 242 is tilted and/or decentered. If the adjustment of the installation state of the second camera module 242 is completed, a position of the sliding assembly 400 may be fixed to the second hole 2222 by the fastening member 430. For example, as shown in FIG. 8F, if the fastening member 430 is maximally or largely fastened, sliding of the sliding assembly 400 along the rail 2223 may be limited, so that the position of the sliding assembly 400 may be fixed to the second hole 2222.

Figure 9A:
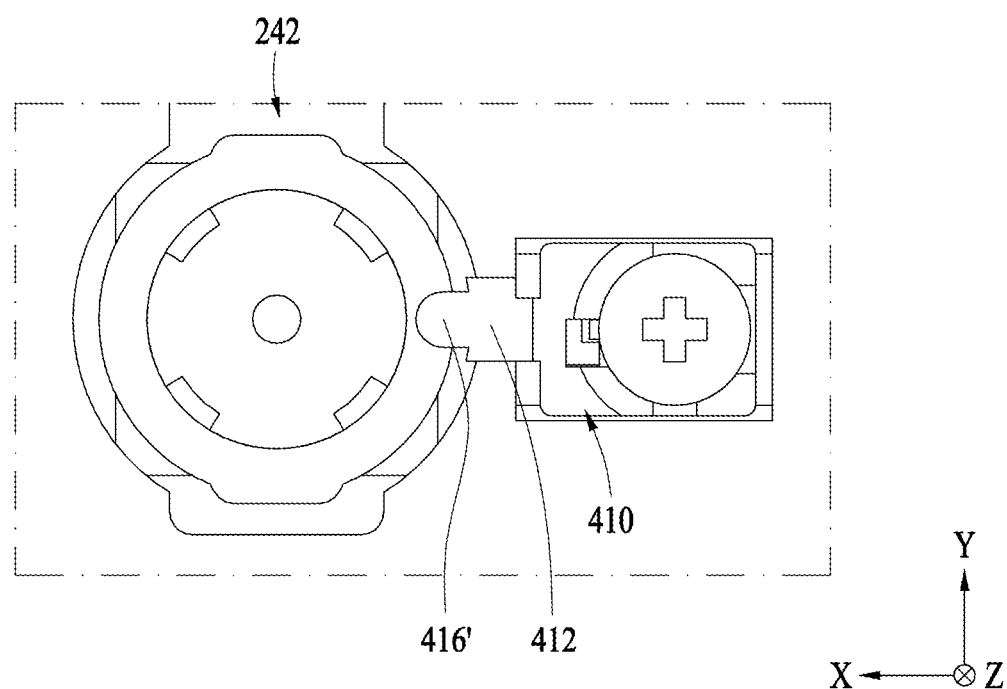
FIG. 9A is a plan view illustrating a state in which a sliding assembly according to an example embodiment is installed.
Figure 9B:
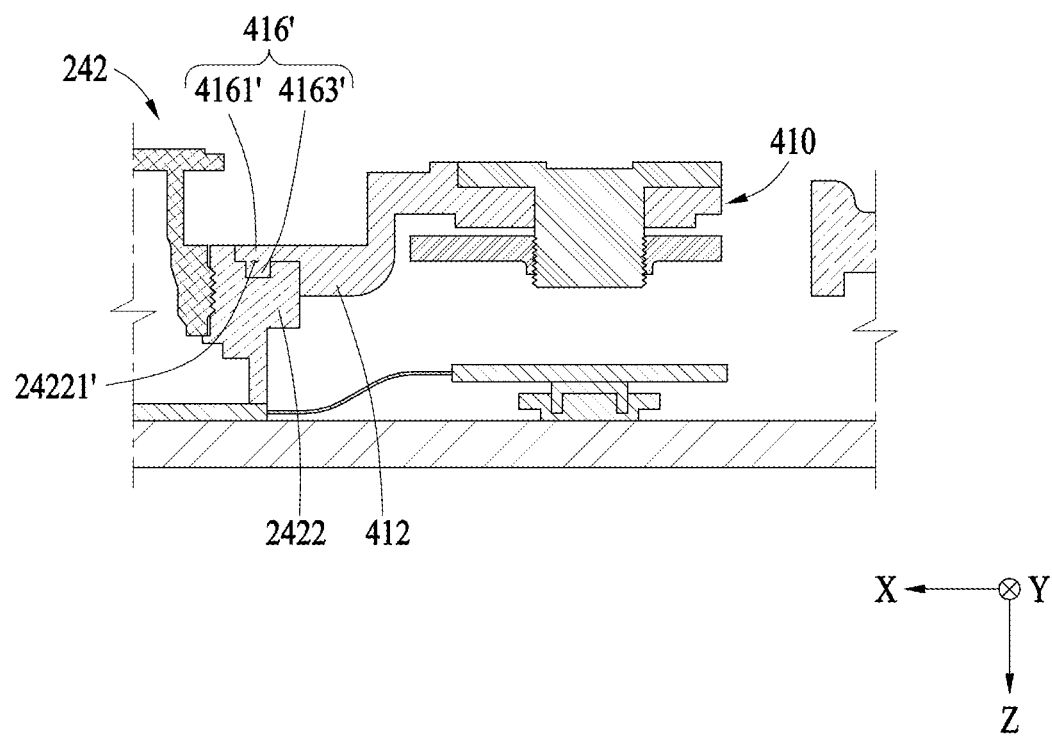
FIG. 9B is a cross-sectional view illustrating a state in which a sliding assembly according to an example embodiment is inserted into a second camera module.

FIG. 9A is a plan view illustrating a state in which a sliding assembly according to one embodiment is installed. FIG. 9B is a cross-sectional view illustrating a state in which the sliding assembly according to one embodiment is inserted into a second camera module. Each camera module herein includes at least part of a camera.

Referring to FIGS. 9A and 9B, in one embodiment, the first sliding member 410 may include an insertion body 416' extending from the first extension body 412. The insertion body 416' may include a first insertion body 4161' and a third insertion body 4163'. The first insertion body 4161' may extend in one direction (e.g., the +x direction) from the first extension body 412, and the third insertion body 4163' may protrude from a bottom surface (e.g., a surface in the +z direction) of the first insertion body 4161'. For example, the third insertion body 4163' may be formed substantially in a projection shape. However, this is merely an example, and a shape of the insertion body 416' is not limited thereto.

In one embodiment, an insertion groove 24221' for insertion of at least a portion of the insertion body 416' of the first sliding member 410 may be formed in the barrel 2422 of the second camera module 242. The insertion groove 24221' may be formed such that an upper side (e.g., the −z direction side) may be opened. The insertion groove 24221' may be formed in a shape corresponding to that of at least a portion of the insertion body 416'. For example, the insertion groove 24221' may have a shape corresponding to those of the first insertion body 4161' and the third insertion body 4163'. For example, the insertion groove 24221' may include a space into which each of the first insertion body 4161' and the third insertion body 4163' is inserted. However, this is merely an example, and a shape of the insertion groove 24221' is not limited thereto.

In the examples of FIGS. 9A and 9B, the installation state of the second camera module 242 may be adjusted in substantially the same manner as the examples described with reference to FIGS. 8A to 8F.

Figure 10A:
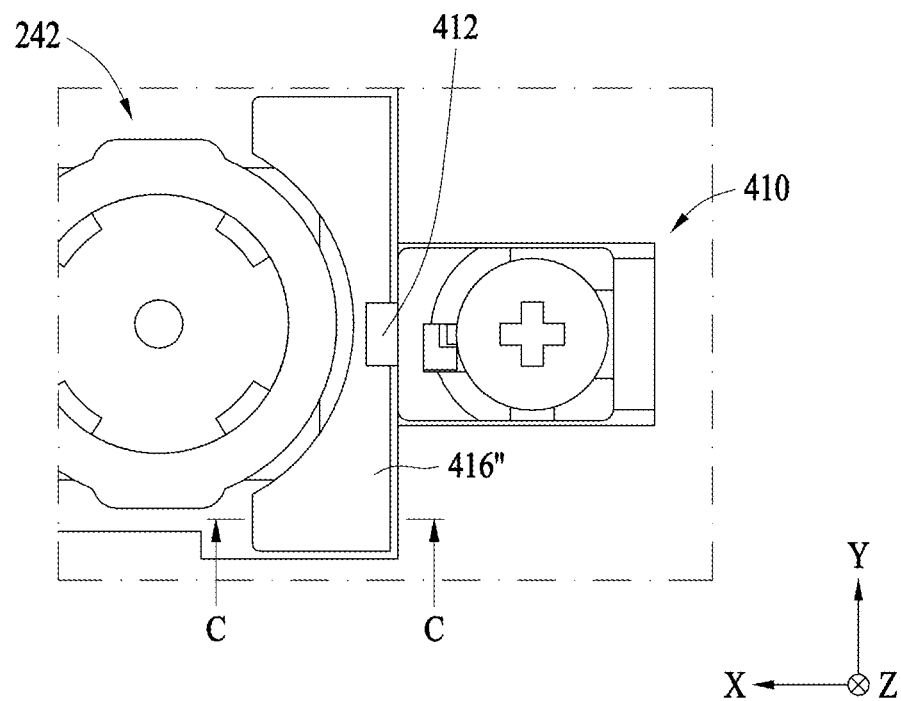
FIG. 10A is a plan view illustrating a state in which a sliding assembly according to an example embodiment is installed.
Figure 10B:
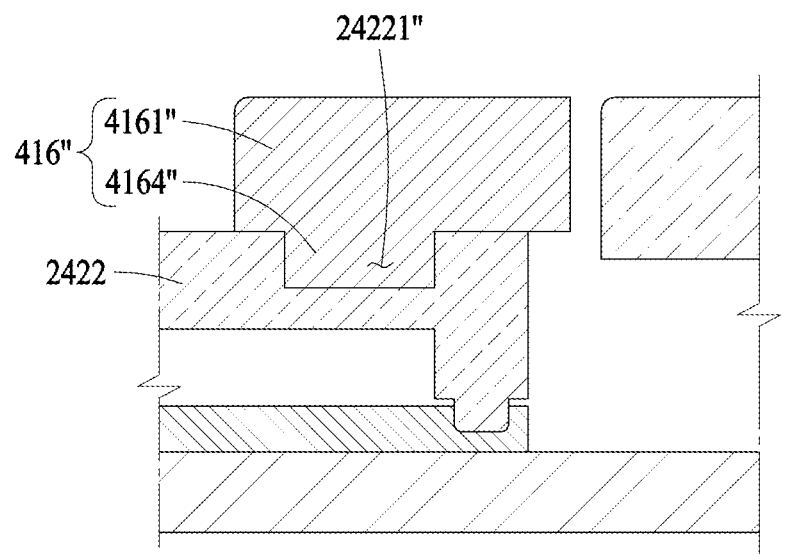
FIG. 10B is a cross-sectional view taken along line C-C of FIG. 10A.
Figure 10B:
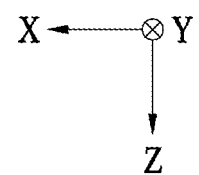

FIG. 10A is a plan view illustrating a state in which a sliding assembly according to one embodiment is installed. FIG. 10B is a cross-sectional view taken along line C-C of FIG. 10A.

Referring to FIGS. 10A and 10B, in one embodiment, the first sliding member 410 may include an insertion body 416" extending from the first extension body 412. The insertion body 416" may include a first insertion body 4161" and a fourth insertion body 4164". The first insertion body 4161" may extend from the first extension body 412 to both sides (e.g., a −y direction side and a +y direction side). For example, the first insertion body 4161" may be shaped to surround at least a portion of an outer diameter of the barrel 2422. The fourth insertion body 4164" may protrude from a bottom surface (e.g., a surface in the +z direction) of both end portions (e.g., a −y side end portion or a +y side end portion) of the first insertion body 4161". For example, the fourth insertion body 4164" may be formed substantially in a projection shape. However, this is merely an example, and a shape of the insertion body 416" is not limited thereto.

In one embodiment, an insertion groove 24221" for insertion of at least a portion of the insertion body 416" of the first sliding member 410 may be formed in the barrel 2422 of the second camera module 242. The insertion groove 24221" may be formed such that an upper side (e.g., a −z direction side) may be opened. The insertion groove 24221" may be formed in a shape corresponding to that of at least a portion of the insertion body 416". For example, the insertion groove 24221" may be depressed in a position corresponding to the fourth insertion body 4164" in a shape corresponding to that of the fourth insertion body 4164" such that the fourth insertion body 4164" may be inserted into the insertion groove 24221". A number of insertion grooves 24221" may correspond to a number of fourth insertion bodies 4164". However, this is merely an example, and a shape of the insertion groove 24221" is not limited thereto.

In the examples of FIGS. 10A and 10B, the installation state of the second camera module 242 may be adjusted in substantially the same manner as the examples described with reference to FIGS. 8A to 8F.

According to embodiments, an electronic device 201 may include: a housing 210 configured to form at least part of an exterior of the electronic device 201; a support member 222 disposed inside the housing 210 and including a first hole 2221 and a second hole 2222 in which a rail 2223 is formed in a longitudinal direction toward the first hole 2221; a camera module 242, comprising a camera, installed at least partially in the support member 222 so that the camera is exposed through the first hole 2221; and a sliding assembly 300 installed at least partially in the second hole 2222 and configured to be slidable along the rail 2223. The sliding assembly 300 may include: a first sliding member 310 installed at least partially in the second hole 2222 in a first direction D1 on a side of the second hole 2222 and including a contact end portion 3121 contactable with the camera module 242; a second sliding member 320 installed at least partially in the second hole 2222 in a second direction D2 opposite to the first direction D1 on another side of the second hole 2222 such that the rail 2223 is positioned between at least the first sliding member 310 and the second sliding member 320; and a fastener 330 configured to fix relative positions of the first sliding member 310 and the second sliding member 320 with respect to the second hole 2222.

In one embodiment, the sliding assembly 300 may be configured to be slidable along the rail 2223, to adjust the installation state of the camera module 242.

In one embodiment, the sliding assembly 300 may be disposed such that the contact end portion 3121 may be configured to be spaced apart from the camera module 242 in an initial state. When the camera module 242 is installed to be tilted and/or decentered, the sliding assembly 300 may be configured to be moved along the rail 2223 in a direction toward the first hole 2221 such that the contact end portion 3121 may be configured to be in contact with the camera module 242.

In one embodiment, the first sliding member 310 may include: a first main body 311 in which a first through-hole 3111 is formed; a first extension body 312 extending from the first main body 311 toward the first hole 2221; and a pair of first hook portions 313 formed to protrude from a surface of the first main body 311 facing the first direction D1 such that hook heads 3131 of the first hook portions 313 face directions opposite to each other.

In one embodiment, the pair of first hook portions 313 may be formed in positions spaced apart inwardly from both end portions of the first main body 311 such that flanges 3113 are formed on both sides of the first main body 311.

In one embodiment, the first sliding member 310 may be installed in the second hole 2222 such that the rail 2223 may be positioned between the flange 3113 and the hook head 3131 of the first hook portion 313.

In one embodiment, the second sliding member 320 may include: a second main body 321 in which a second through-hole 3211 is formed; and at least a pair of second extension bodies 322 extending from both sides of the second main body 321.

In one embodiment, the second sliding member 320 may be installed in the second hole 2222 such that a surface of the second extension body 322 facing the second direction D2 may be in contact with the rail 2223.

In one embodiment, the rail 2223 may be positioned between at least the flange 3113 and the second extension body 322.

In one embodiment, the fastener 330 may be positioned at least partially through the first through-hole 3111 and the second through-hole 3211.

In one embodiment, a surface of the rail 2223 may be formed as a curved surface to be in line contact with the flange 3113 or the second extension body 322.

In one embodiment, the first sliding member 310 may further include a second hook portion 314 formed to protrude from the surface of the first main body 311 facing the first direction D1. The second sliding member 320 may further include a hook insertion hole 3212 formed in a corresponding position of the second main body 321 such that the second hook portion 314 can be inserted to couple the first sliding member 310 and the second sliding member 320 to each other.

In one embodiment, the first sliding member 310 may further include an aligned protrusion 315 formed to protrude from the surface of the first main body 311 facing the first direction D1. The second sliding member 320 may further include an alignment hole 3213 formed in a corresponding position of the second main body 321 such that the aligning protrusion 315 is inserted.

In one embodiment, the housing 210 may include: a cover plate 2121' disposed to cover at least the support member 222; a window arrangement portion 2122' positioned on one surface of the cover plate 2121'; and a camera window 2123' disposed in the window arrangement portion 2122'. The window arrangement portion 2122' may include a third hole 21221' formed in a position corresponding to the first hole 2221, and a fourth hole 21222' formed in a position corresponding to the second hole 2222.

In one embodiment, the camera module 242 may further include an FPCB 2424 connected to a camera. The second hole 2222 may be formed in a position that at least partially overlaps the FPCB 2424 when the electronic device 201 is viewed from the front side.

According to embodiments, an electronic device 201 may include: a housing 210 configured to form at least part of an exterior of the electronic device 201; a support member 222 disposed inside the housing 210 and including a first hole 2221 and a second hole 2222 in which a rail 2223 is formed in a longitudinal direction toward the first hole 2221; a camera module 242, comprising a camera, installed at least partially in the support member 222 so that the camera is exposed through the first hole 2221; and a sliding assembly 400 installed at least partially in the second hole 2222 and configured to be slidable along the rail 2223. The sliding assembly 400 may include: a first sliding member 410 installed at least partially in the second hole 2222 in a first direction D1 on a side of the second hole 2222 and contactable with the camera module 242; a second sliding member 420 installed at least partially in the second hole 2222 in a second direction D2 opposite to the first direction D1 on another side of the second hole 2222 such that the rail 2223 is positioned between at least the first sliding member 410 and the second sliding member 420; and a fastener 430 configured to fix relative positions of the first sliding member 410 and the second sliding member 420 with respect to the second hole 2222. The first sliding member 410 may include: a first main body 311; a first extension body 412 extending from the first main body 311 toward the first hole 2221; and an insertion body 416 extending from the first extension body 412. The camera module 242 may include: a barrel 2422 in which the camera is disposed, and an insertion groove 24221 formed in a shape corresponding to that of at least a portion of the insertion body 416 in the barrel 2422 such that at least a portion of the insertion body 416 is inserted.

In one embodiment, the insertion body 416 may include: a first insertion body 4161 extending from the first extension body 412 to a first width; and a second insertion body 4162 extending from the first insertion body 4161 to a second width greater than the first width.

In one embodiment, the insertion body 416' may include: a first insertion body 4161' extending from the first extension body 412; and a third insertion body 4163' formed to protrude from a surface of the first insertion body 4161' facing the first direction D1.

In one embodiment, the insertion body 416" may include: a first insertion body 4161" extending from the first extension body 412 to both sides; and a fourth insertion body 4164" formed to protrude from surfaces of both end portions of the first insertion body 4161" toward the first direction D1.

According to embodiments, an electronic device 201 may include: a housing 210 configured to form at least part of an exterior of the electronic device 201; a support member 222 disposed inside the housing 210 and including a first hole 2221 and a second hole 2222 in which a rail 2223 is formed in a longitudinal direction toward the first hole 2221; a camera module 242, comprising a camera, installed at least partially in the support member 222 so that the camera is exposed through the first hole 2221; and a sliding assembly 300 installed at least partially in the second hole 2222 and configured to be slidable along the rail 2223. The sliding assembly 300 may include: a first sliding member 310 installed at least partially in the second hole 2222 in a first direction D1 on a side of the second hole 2222 and including a contact end portion 3121 contactable with the camera module 242; a second sliding member 320 installed at least partially in the second hole 2222 in a second direction D2 opposite to the first direction D1 on another side of the second hole 2222 such that the rail 2223 is positioned between at least the first sliding member 310 and the second sliding member 320; and a fastener 330 configured to fix relative positions of the first sliding member 310 and the second sliding member 320 with respect to the second hole 2222. The first sliding member 310 may include: a first main body 311 in which a first through-hole 3111 is formed; a first extension body 312 extending from the first main body 311 toward the first hole 2221; a pair of first hook portions 313 formed to protrude from a surface of the first main body 311 facing the first direction D1 such that hook heads 3131 of the first hook portions 313 face directions opposite to each other; and a second hook portion 314 formed to protrude from the surface of the first main body 311 facing the first direction D1. The second sliding member 320 may include: a second main body 321 in which a second through-hole 3211 is formed; at least a pair of second extension bodies 322 extending from both sides of the second main body 321; and a hook insertion hole 3212 formed in a corresponding position of the second main body 321 such that the second hook portion 314 is inserted to couple the first sliding member 310 and the second sliding member 320 to each other. The sliding assembly 300 may be disposed such that the contact end portion 3121 is spaced apart from the camera module 242 in an initial state. When the camera module 242 is installed to be tilted or decentered, the sliding assembly 300 may be moved along the rail 2223 in a direction toward the first hole 2221 such that the contact end portion 3121 is in contact with the camera module 242.

What is claimed is:

1. An electronic device, comprising:
    a housing configured to form at least part of an exterior of the electronic device;
    a support member disposed inside the housing, the support member comprising a first hole, and a second hole in which a rail is formed in a longitudinal direction toward the first hole;
    a camera module, comprising a camera, installed at least partially in the support member so that the camera is exposed through the first hole; and
    a sliding assembly installed at least partially in the second hole and configured to be slidable along the rail,
    wherein the sliding assembly comprises:
        a first sliding member installed at least partially in the second hole in a first direction on a side of the second hole, the first sliding member comprising a contact end portion contactable with the camera module;
        a second sliding member installed at least partially in the second hole in a second direction opposite to the first direction on another side of the second hole such that the rail is positioned between at least the first sliding member and the second sliding member; and
        a fastener configured to fix relative positions of the first sliding member and the second sliding member with respect to the second hole.

2. The electronic device of claim 1, wherein the sliding assembly is configured to be slidable along the rail to adjust an installation state of the camera module.

3. The electronic device of claim 2, wherein
    the sliding assembly is disposed such that the contact end portion is configured to be spaced apart from the camera module in an initial state, and
    when the camera module is installed to be tilted and/or decentered, the sliding assembly is configured to be moved along the rail in a direction toward the first hole such that the contact end portion is configured to be in contact with the camera module.

4. The electronic device of claim 1, wherein the first sliding member comprises:
    a first main body in which a first through-hole is formed;
    a first extension body extending from the first main body toward the first hole; and
    a pair of first hook portions formed to protrude from a surface of the first main body facing the first direction such that hook heads of the first hook portions face directions opposite to each other.

5. The electronic device of claim 4, wherein the pair of first hook portions are formed in positions spaced apart inwardly from both end portions of the first main body such that flanges are formed on both sides of the first main body.

6. The electronic device of claim 5, wherein the first sliding member is installed in the second hole such that the rail is positioned between a flange and a hook head of the first hook portion.

7. The electronic device of claim 5, wherein the second sliding member comprises:
    a second main body in which a second through-hole is formed; and
    at least a pair of second extension bodies formed to extend from both sides of the second main body.

8. The electronic device of claim 7, wherein the second sliding member is installed in the second hole such that a surface of the second extension body facing the second direction is in contact with the rail.

9. The electronic device of claim 8, wherein the rail is positioned between at least the flange and the second extension body.

10. The electronic device of claim 9, wherein the fastener is positioned at least partially through the first through-hole and the second through-hole.

11. The electronic device of claim 10, wherein a surface of the rail is formed as a curved surface to be in line contact with the flange or the second extension body.

12. The electronic device of claim 7, wherein
    the first sliding member further comprises a second hook portion formed to protrude from a surface of the first main body facing the first direction, and
    the second sliding member further comprises a hook insertion hole formed in a corresponding position of the second main body such that the second hook portion can be inserted to couple the first sliding member and the second sliding member to each other.

13. The electronic device of claim 7, wherein
    the first sliding member further comprises an aligning protrusion formed to protrude from a surface of the first main body facing the first direction, and
    the second sliding member further comprises an alignment hole formed in a corresponding position of the second main body such that the aligning protrusion is inserted.

14. The electronic device of claim 1, wherein
    the housing comprises:
        a cover plate disposed to cover at least the support member;
        a window arrangement portion positioned on one surface of the cover plate; and
        a camera window disposed on the window arrangement portion, and
    the window arrangement portion comprises a third hole formed in a position corresponding to the first hole, and a fourth hole formed in a position corresponding to the second hole.

15. The electronic device of claim 1, wherein
    the camera module further comprises a flexible printed circuit board (FPCB) connected to the camera, and
    the second hole is formed in a position that at least partially overlaps the FPCB when the electronic device is viewed from a front side.

16. An electronic device, comprising:
    a housing configured to form at least part of an exterior of the electronic device;
    a support member disposed inside the housing, the support member comprising a first hole, and a second hole in which a rail is formed in a longitudinal direction toward the first hole;
    a camera module, comprising a camera, installed at least partially in the support member so that the camera is exposed through the first hole; and
    a sliding assembly installed at least partially in the second hole and configured to be slidable along the rail,
    wherein the sliding assembly comprises:
        a first sliding member installed at least partially in the second hole in a first direction on a side of the second hole, the first sliding member being contactable with the camera module;
        a second sliding member installed at least partially in the second hole in a second direction opposite to the first direction on another side of the second hole such that the rail is positioned between at least the first sliding member and the second sliding member; and a fastener configured to fix relative positions of the first sliding member and the second sliding member with respect to the second hole,
wherein the first sliding member comprises:
    a first main body;
    a first extension body extending from the first main body toward the first hole; and
    an insertion body extending from the first extension body, and
wherein the camera module comprises:
    a barrel in which the camera is disposed; and
    an insertion groove formed in the barrel in a shape corresponding to a shape of at least a portion of the insertion body such that at least a portion of the insertion body is inserted.

17. The electronic device of claim 16, wherein the insertion body comprises:
    a first insertion body extending from the first extension body to a first width; and
    a second insertion body extending from the first insertion body to a second width greater than the first width.

18. The electronic device of claim 16, wherein the insertion body comprises:
    a first insertion body extending from the first extension body; and
    a third insertion body formed to protrude from a surface of the first insertion body facing the first direction.

19. The electronic device of claim 16, wherein the insertion body comprises:
    a first insertion body extending from the first extension body to both sides; and
    a fourth insertion body formed to protrude from a surface of each of both end portions of the first insertion body facing the first direction.

20. An electronic device, comprising:
    a housing configured to form at least part of an exterior of the electronic device;
    a support member disposed inside the housing, the support member comprising a first hole, and a second hole in which a rail is formed in a longitudinal direction toward the first hole;
    a camera module, comprising a camera, installed at least partially in the support member so that the camera is exposed through the first hole; and
    a sliding assembly installed at least partially in the second hole and configured to be slidable along the rail,
wherein the sliding assembly comprises:
    a first sliding member installed at least partially in the second hole in a first direction on a side of the second hole, the first sliding member comprising a contact end portion contactable with the camera module;
    a second sliding member installed at least partially in the second hole in a second direction opposite to the first direction on another side of the second hole such that the rail is positioned between at least the first sliding member and the second sliding member; and
    a fastener configured to fix relative positions of the first sliding member and the second sliding member with respect to the second hole,
wherein the first sliding member comprises:
    a first main body in which a first through-hole is formed;
    a first extension body extending from the first main body toward the first hole;
    a pair of first hook portions formed to protrude from a surface of the first main body facing the first direction such that hook heads of the first hook portions face directions opposite to each other; and
    a second hook portion formed to protrude from a surface of the first main body facing the first direction,
wherein the second sliding member comprises:
    a second main body in which a second through-hole is formed;
    at least a pair of second extension bodies formed to extend from both sides of the second main body; and
    a hook insertion hole formed in a corresponding position of the second main body such that the second hook portion is inserted to couple the first sliding member and the second sliding member to each other,
wherein the sliding assembly is disposed such that the contact end portion is spaced apart from the camera module in an initial state, and
wherein when the camera module is installed to be tilted or decentered, the sliding assembly is moved along the rail in a direction toward the first hole such that the contact end portion is in contact with the camera module.

* * * * *